(12) United States Patent
Takahashi

(10) Patent No.: US 6,727,999 B1
(45) Date of Patent: Apr. 27, 2004

(54) IMAGE FORMATION SYSTEM

(75) Inventor: Hiroyuki Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/412,430

(22) Filed: Oct. 5, 1999

(30) Foreign Application Priority Data

Oct. 7, 1998 (JP) .......................... 10-285339
Oct. 7, 1998 (JP) .......................... 10-285340
Oct. 7, 1998 (JP) .......................... 10-285341

(51) Int. Cl.[7] .......................... G06F 15/00; G03G 15/00; B42B 2/00
(52) U.S. Cl. .................... 358/1.15; 358/1.15; 358/1.16; 399/403; 399/1; 270/52.02; 270/1.02
(58) Field of Search ............................ 270/52.02, 1.02, 270/1.03; 358/1.15, 1.9, 1.16, 448, 452, 453; 399/403, 1

(56) References Cited

U.S. PATENT DOCUMENTS

| | | | | |
|---|---|---|---|---|
| 5,644,685 A | * | 7/1997 | Baehr | .................. 358/1.12 |
| 5,815,764 A | * | 9/1998 | Tomory | .................. 399/1 |
| 6,157,465 A | * | 12/2000 | Suda et al. | .................. 358/407 |
| 6,204,935 B1 | * | 3/2001 | Soma et al. | .................. 358/448 |
| 6,224,048 B1 | * | 5/2001 | Motamed | .................. 270/52.02 |
| 2002/0089689 A1 | * | 7/2002 | Ferlitsch et al. | .................. 358/1.15 |

* cited by examiner

*Primary Examiner*—Kimberly Williams
*Assistant Examiner*—Saeid Ebrahimi
(74) *Attorney, Agent, or Firm*—Fitzpatrick, Cella, Harper & Scinto

(57) ABSTRACT

In order to relieve the load for an user and smooth an operation of the user in case of mixing each of sheets, on which images are formed by separating jobs, in predetermined page order of the job, color pages in the job outputted from a computer are printed by a color MFP and black/white pages are printed by a black/white MFP. Thereafter, on the computer, it is displayed that each sheaf of sheets has to be set in which bin of a collator, to the user. The user sets a sheaf of sheets printed by each of the MFP's in the collator. The collator mixes color pages with black/white pages. Further, each MFP prints bar codes representing page information or job information. The user sets a sheaf of sheets printed by each of the MFP's in the collator. The collator reads the bar codes to mix the color pages with the black/white pages.

75 Claims, 27 Drawing Sheets

IMAGE FORMATION SYSTEM

BACKGROUND OF THE INVENTION

1. Field of the Invention

The present invention relates to an image formation system having image formation apparatuses which are connected to a network.

2. Related Background Art

Conventionally, in a system having a color printer and a monochrome printer which are connected to a network, in a case where an user at a client computer causes the printers to perform a network print, it has been known that the user selects a printer among plural printers including the color printer and the monochrome printer to perform a print on a computer network. Although the color printer can perform the print in full color, in respect of printing speed and the cost of printing, the monochrome printer is superior to the color printer. Therefore, in a case where color originals coexist with black/white originals in a job, it is desirable that color pages are to be printed by the color printer and black/white pages are to be printed by the monochrome printer.

However, since sheets printed by the color printer and the monochrome printer have to be assorted in page order by the handwork of the user, there occurs an inconvenience situation. Particularly, in a case where a lot of sheets are to be printed, although processing time and the cost are remarkably exposed, required time for the handwork by the user becomes considerable. It is desired to save this waste of time.

Further, conventionally, in a system having the printers connected to the network, it has been known that the user at the client computer causes the printers to perform the network print. In a case where images of plural different formats held on the client computer are intended to be printed out, it is required to perform the print according to an application software adapted to each of the formats.

However, in a case where the images of plural different formats are intended to be made in a book as one material, after performing the print according to respective application softwares, the user has to assort sheets, on which the images are printed, in page order by the handwork.

Like this case, when the sheets, on which the images of plural jobs in different environments are printed out, are intended to be collected as one material, some portions which can not be processed on a computer are found. That is, the user has to deal with the printed-out sheets by the handwork while spreading the sheets on a desk. This situation is inefficient, therefore, it is also desired to save this waste of the work.

Also, in a case where sheets, on which images from plural client computers running with different OS are printed out, are intended to be collected as one material, there occurs the same problem as above.

SUMMARY OF THE INVENTION

An object of the present invention is to provide an image formation system which can solve the above-mentioned problem.

Another object of the present invention is to provide the image formation system enables to relieve a load of an user in case of mixing each of sheets, on which images are formed by separating jobs, in predetermined page order of the job and enables to smooth the work of the user.

Still another object of the present invention is to provide the image formation system enables to relieve the load of the user in case of mixing each of the sheets of plural different jobs as one group and enables to smooth the work of the user.

The other objects and features of the present invention will be apparent from the following detailed explanation and the attached drawings.

BRIEF DESCRIPTION OF THE DRAWINGS

FIG. 17 is a view showing a cover page where bar codes are added on;

DETAILED DESCRIPTION OF THE PREFERRED EMBODIMENTS

[General Description of System]

Figure 1:
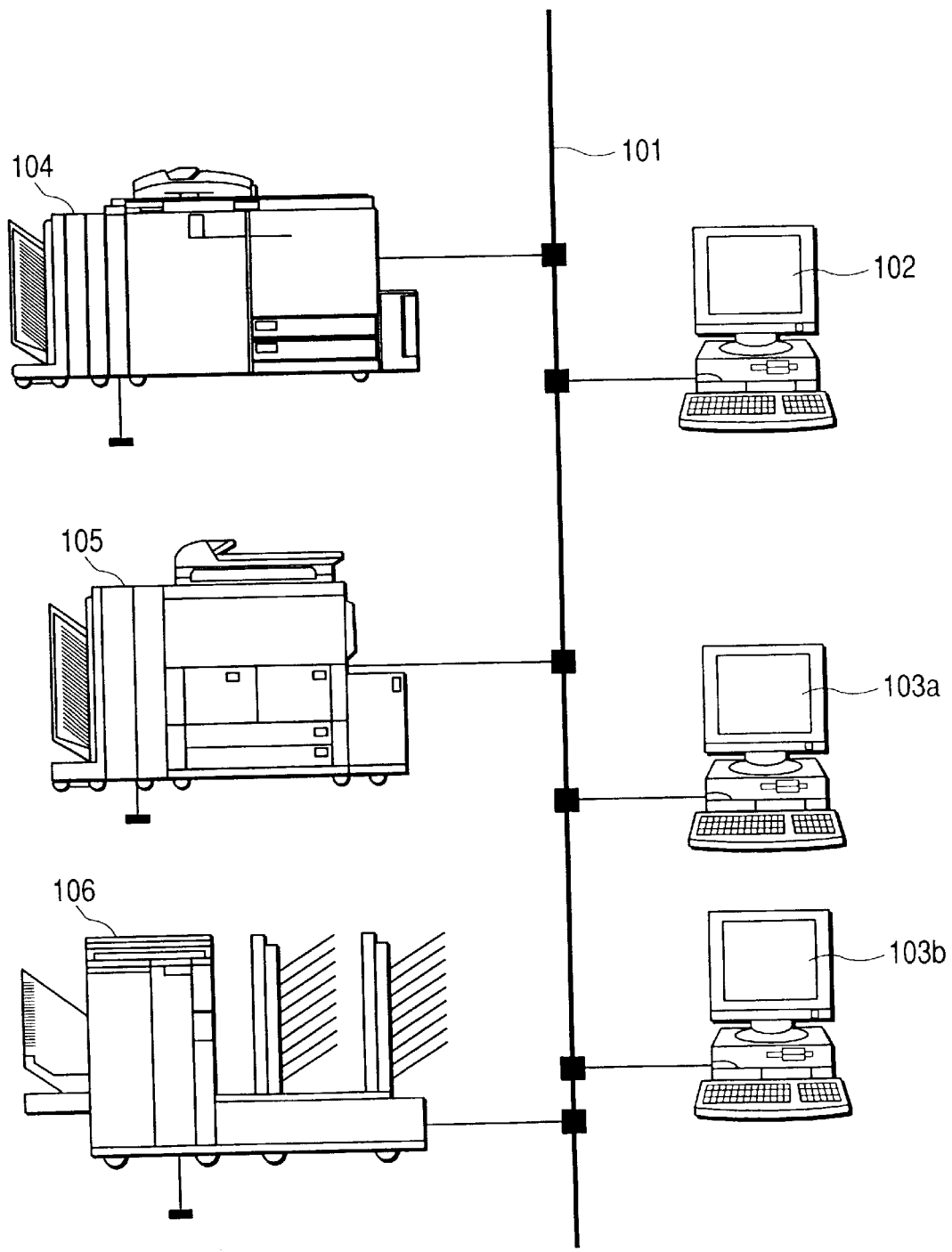
FIG. 1 is a view showing an entire of an image formation system in the present embodiment.
Figure 2:
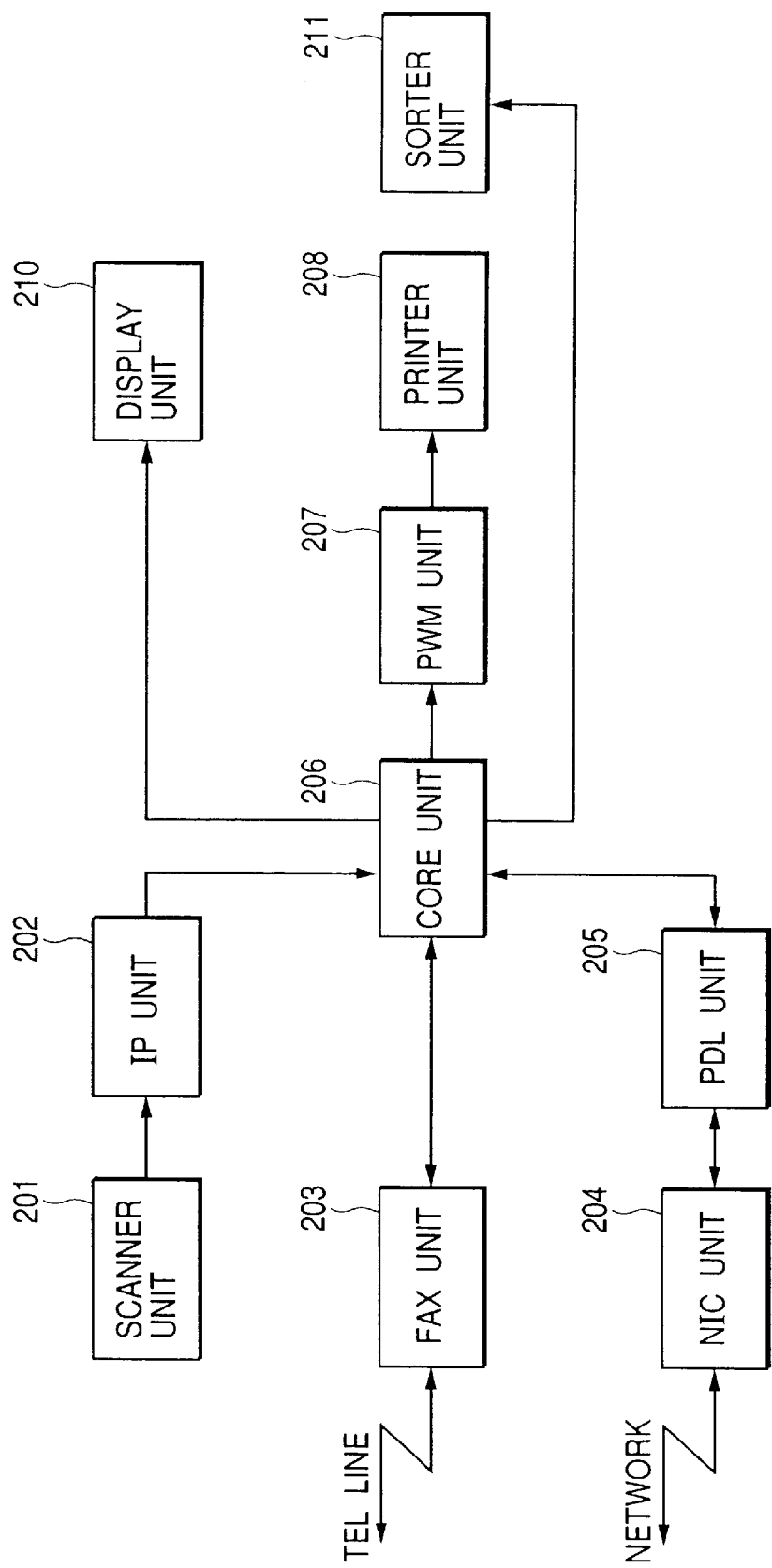
FIG. 2 is a block diagram of an entire image formation apparatus.

FIG. 1 shows the outline of a system of an embodiment for the present invention. A computer 102 connected to a network 101 is a sever, computers 103a and 103b are clients. Although not shown, several other clients are also connected. Hereafter, numeral 103 is considered as a representative of the clients.

Further, MFP's (Multi Functional Peripheral) 104 and 105 are connected to the network 101. Numeral 104 is a color MFP capable of full color scanning, printing and the like. Numeral 105 is a black and white MFP, performing monochromatic scanning, printing and the like. In addition, although not shown, machines other than the above-mentioned MFP's such as scanners, printers, faxes or the like are connected to the network 101.

Here, by running application softwares which perform so-called DTP (Desk Top Publishing) on the computer 103, all sort of texts/figures are created/edited. The computer 103 converts the produced texts/figures into PDL (Page Description Language) and sends them to the MFP's 104 and 105 via the network 101 for print out.

As a mechanism to inform successively the computers 102 and 103 side, on the information and the status of the MFP's 104 and 105, the MFP's 104 and 105 respectively are provided with communication means which allows data exchange with the computers 102 and 103 through the network 101. Moreover, the computers 102 and 103 have utility softwares which function by receiving the information such that the MFP's 104 and 105 can be managed by the computers 102 and 103.

Additionally, a collator 106 is connected to the network 101 and is controlled through the network 101. When an user takes out sheets printed by the color MFP 104 and the black/white MFP 105 and sets them to the collator 106, the collator 106 performs a mixing processing of the color and black/white pages, and the user can obtain a production configured by the order following the page order of a job.

[Structure of the MFP's 104 and 105]

Next, the structure of the MFP's 104 and 105 will be explained using FIGS. 2 to 12. However, since the difference between the MFP's 104 and 105 is the difference between full color and monochrome, and since full color machines often include the same structure as monochrome machines, with the exception of the color processing parts, the explanation will be limited here to the full color machines and, at any time, explanations for the monochrome machine will be added, if needed.

The MFP's 104 and 105 include a scanner unit 201 which performs image reading, an IP unit 202 for image processing of image data, a FAX unit 203, which is a typical style of facsimile communication, performs transmission/reception of images using a telephone line, moreover, an NIC (Network Interface Card) unit 204 to exchange image data or information on the devices using the network and a PDL unit 205 which develops the page description language (PDL) sent by the computer 103 into an image signal. Then, according to the usage of the MFP's 104 and 105, a core unit 206 temporarily stores the image signal or determines their routes.

Then, the image data outputted by the core unit 206 is sent to a printer unit 208 which performs image formation. The sheets printed out by the printer unit 208 are sent to a finisher unit 209 where assortment of the sheets is performed.

In addition, a display unit 210 can be used to check without printing the content of an image or to check the aspect of the image prior to printing (preview).

[Structure of the Scanner Unit 201]

Figure 3:
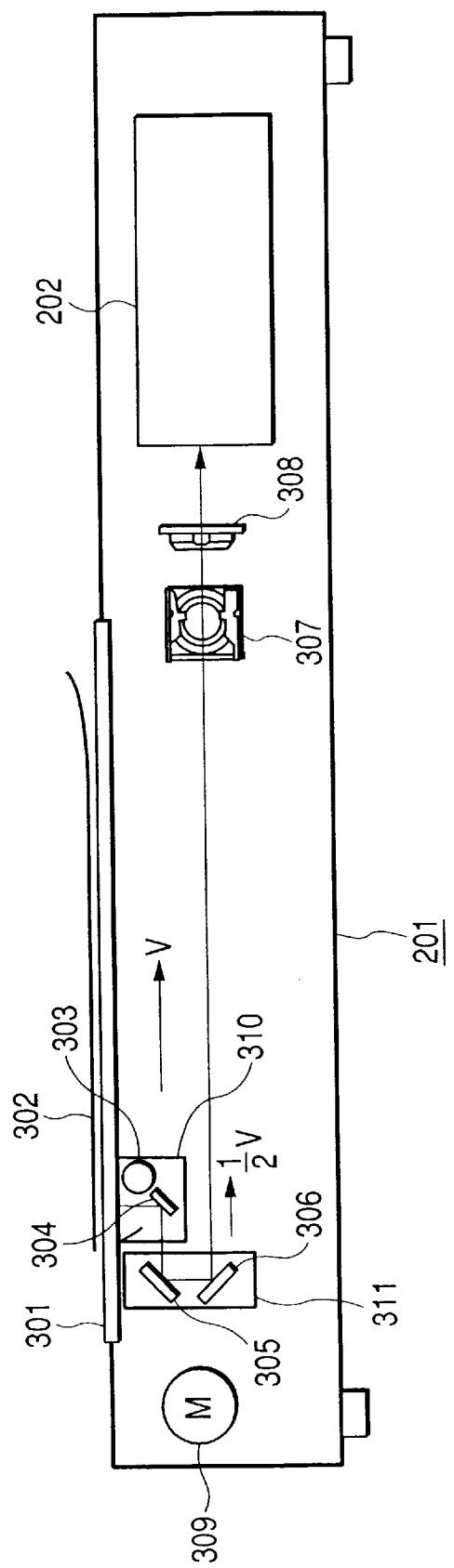
FIG. 3 is a view showing a scanner unit of the image formation apparatus.

The structure of the scanner unit 201 will be explained using FIG. 3. Numeral 301 is a document table glass on which a document 302 to be read is placed. The document 302 is exposed by an illuminating lamp 303 and its reflected light pass via mirrors 304, 305 and 306, through a lens 307 to form an image on a CCD 308. The whole surface of the document 302 is scanned by moving a first mirror unit 310 comprising the mirror 304 and the illuminating lamp 303 at speed V, and by moving a second mirror unit 311 comprising the mirrors 305 and 306 at speed ½ V. The first mirror unit 310 and the second mirror unit 311 are driven by a motor 309.

[Structure of the Image Processing Unit 202]

Figure 4:
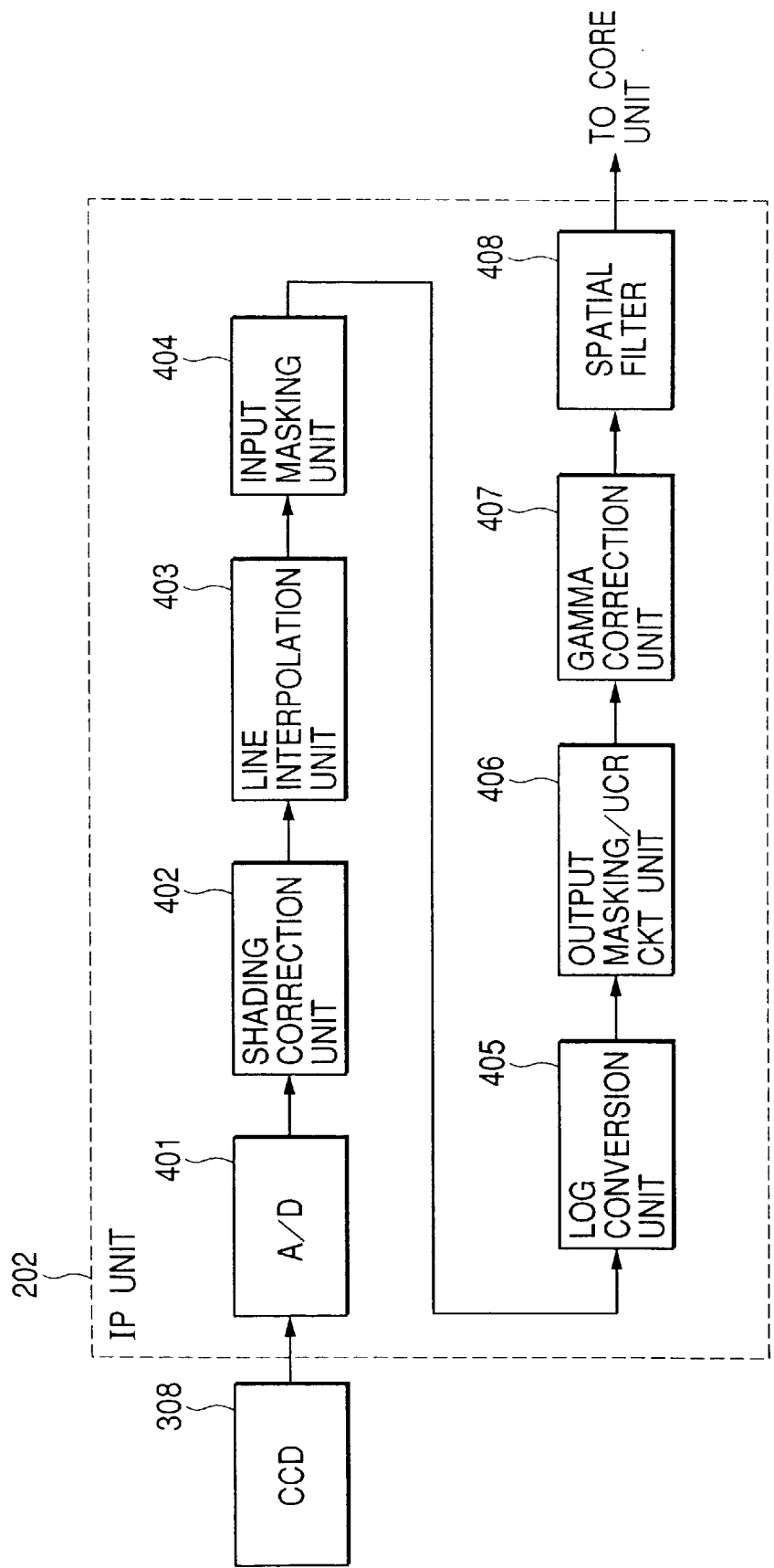
FIG. 4 is a block diagram of an IP unit of the image formation apparatus.

The structure of the IP unit (image processing unit) 202 will be explained using FIG. 4. The inputted optical signal is converted to electrical signal by the CCD sensor 308. The CCD sensor 308 is an R, G and B three lines color sensor and each RGB image signal is inputted to an A/D converter unit 401. Here, after gain adjustment and offset adjustment, each color signal is converted to 8-bit digital image signals R0, G0 and B0 by the A/D converter. Then, in a shading correction unit 402, using a signal read from a white calibration standard, a known shading correction is applied to each color. Further, since each color line sensor of the CCD sensor 308 are placed mutually separated by a fixed distance, the spatial offset of sub-scanning direction is corrected by a line delay control circuit (line interpolation unit) 403.

Then, an input masking unit 404 is a unit which converts the reading color space determined by the optical characteristics of the R, G and B filters of the CCD sensor 308 to the NTSC standard color space, and converts the inputted signals (R0, G0 and B0) to standard signals (R, G and B) by performing a 3×3 matrix calculation which uses characteristic constants of the devices, taking into account various characteristics such as the sensitivity characteristics of the CCD sensor 308, the spectral characteristics of the illuminating lamp and the like.

Further, a luminance/density conversion unit (LOG conversion unit) 405 is formed by a look up table (LUT) RAM and allows the conversion of luminance signals of R, G and B into density signals of C1, M1 and Y1.

Numeral 406 is an output masking/UCR CKT unit, which is a unit that uses matrix calculation to convert M1, C1 and Y1 signals into Y, M, C and K signals, the toner colors of the image formation apparatus. The output masking/UCR CKT unit 406 corrects C1, M1, Y1 and K1 signals, which are based on the R, G and B signals read in by the CCD sensor 308, into C, M, Y and K signals, which are based on the spectral distribution of the toner, and outputs them.

Then, a gamma correction unit 407 uses the look up table (LUT) RAM which takes into account various characteristics of toner colors, to convert into C, M, Y and K data, for image output. In a spatial filter 408, after sharpness or smoothing is applied, the image signal is sent to the core unit 206.

In case a monochrome image processing is to be performed by the MFP 105, after A/D conversion and shading of a single color using a single color 1-line CCD sensor, the order in which to process with input and output masks, gamma conversion and spatial filter is indifferent.

[Structure of the FAX Unit 203]

Figure 5:
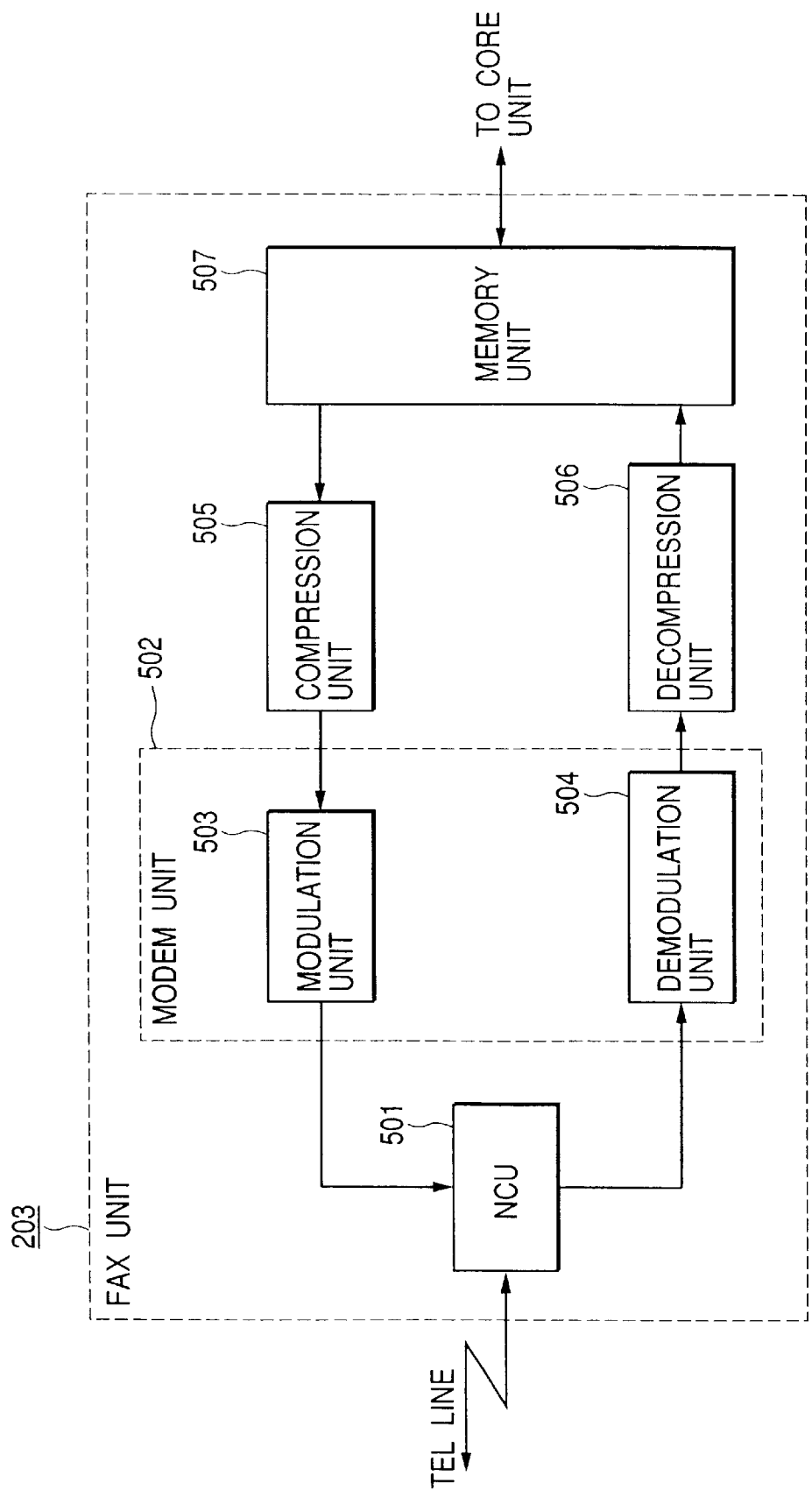
FIG. 5 is a block diagram of a FAX unit of the image formation apparatus.

The structure of the FAX unit 203 will be explained using FIG. 5. First, when receiving, a conversion is performed by an NCU unit 501, of the voltage received from data incoming from the telephone line. After A/D conversion and demodulation processing have been performed by a demodulation unit 504 inside a modem unit 502, a development into raster data is performed in a decompression unit 506. Generally, compression and decompression by the FAX uses the run length method or the like. The image converted to the raster data is temporarily stored in a memory unit 507, and sent to the core unit 206 after verifying that the image data has no transmission errors.

Then, when transmitting, in a compression unit 505, compression such as the run length method is applied to a raster image signal which came from the core unit, after D/A conversion and the demodulation processing have been performed by a modulation unit 503 inside the modem unit 502, the signal is sent to the telephone line through the NCU unit 501.

[Structure of the NIC Unit 204]

Figure 6:
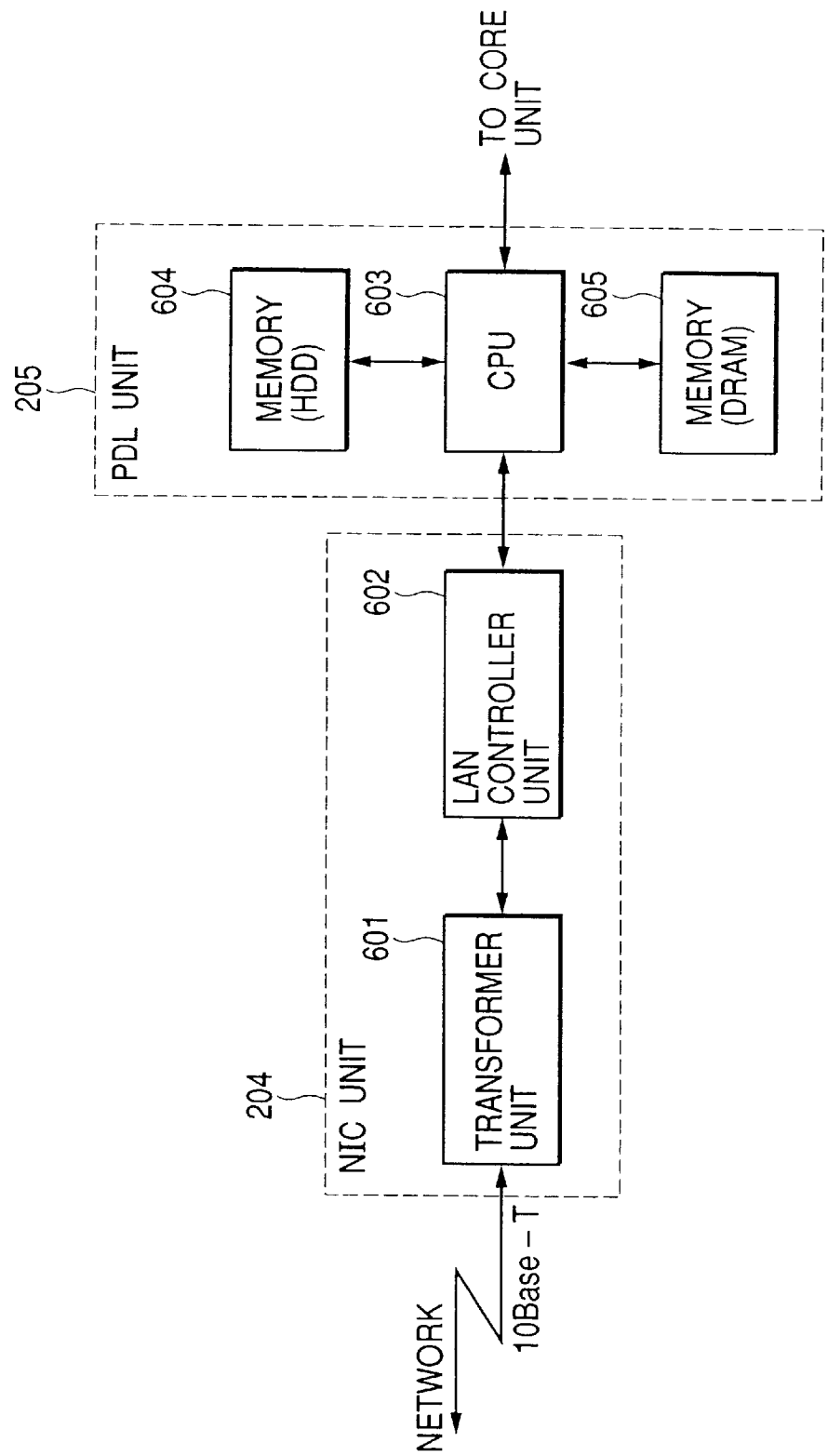
FIG. 6 is a block diagram of an NIC unit and a PDL unit of the image formation apparatus.

The structure of the NIC 204 will be explained using FIG. 6. The NIC unit 204 functions as an interface to the network 101 and plays the role of taking information from the outside and giving information to the outside by using ethernet cables such as 10Base-T/100Base-TX for example.

In the case information is being taken from the outside, the voltage is first converted by a transformer unit 601 and sent to a LAN controller unit 602. The LAN controller unit 602 has a first buffer memory (not shown in the figure) inside, and after judging whether the information is needed or not, sends it to a second buffer memory (not shown in the figure) and sends the signal to the PDL unit 205.

Then, in the case information is to be submitted outside, necessary information is added by the LAN controller unit 602 to the data sent by the PDL unit 205, and connected to the network 101 through the transformer unit 601.

[Structure of the PDL Unit 205]

Then, the PDL unit 205 will be explained using the same FIG. 6. The image data created with software applications running on the computer 103 is formed by texts, figures and photographs, each of which are made by combining image description elements such as text code, graphic code and raster image data. This is the so-called PDL (Page Description Language) of which Adobe's Post Script (Trade Mark) language is a representative.

The PDL unit 205 performs the conversion processing of the above-mentioned PDL data into the raster image data. First, the PDL data sent by the NIC unit 204 goes through a CPU unit 603 and is stored once on a high capacity memory 604 such as a hard disk (HDD), and is managed, stored for each job. Then, according to the need, the CPU unit 603 performs a rasterizing image processing called RIP (Raster Image Processing) and develops the PDL data into a raster image. The developed raster image data is stored for each CMYK color component, in a memory 605 allowing high speed access such as DRAM by page unit for each job and according to the status of the printer unit 208, is sent through the CPU unit 603 again to the core unit 206.

[Structure of the Core Unit 206]

The core unit 206 will be explained using FIG. 7 A bus selector unit 701 of the core unit 206 bears the role of traffic control through the use of the MFP's 104 and 105. In other words, it is the place where bus switching is performed by the MFP's 104 and 105 according to each function type such as photographic function, network scan, network print, facsimile transmission/reception or display.

Shown below are the bus switching patterns for performing each function.

photographic function:
   scanner 201→core 206→printer 208
network scan:
   scanner 201→core 206→NIC unit 204
network print:
   NIC unit 204→core 206→printer 208
facsimile transmission function:
   scanner 201→core 206→FAX unit 203
facsimile reception function:
   FAX unit 203→core 206→printer 208
display function:
   scanner 201 or FAX unit 203 or NIC unit 204→core 206→display 210

Then, the image data exited from the bus selector unit 701 is sent to a compression unit 702, a memory unit 703 made of high capacity memory such as hard disks (HDD) and, through a decompression unit 704, to the printer unit 208 (PWM unit 207) or the display unit 210. Compression methods used in the compression unit 702 can be general such as JPEG, JBIG, ZIP or the like. Compressed image data is managed for each job and stored together with additional data such as file name, author, creation date, file size.

Further, by creating job numbers and passwords and storing them as well, it is possible to support personal box function. It is a function which provides a temporary storage of data or allow the print out (reading from the HDD) to only specific people. If the instruction to print out is issued, after verification of the password, the data is recalled from the memory unit 703, goes through image decompression, is reverted to the raster image and sent do the printer unit 207.

[Structure of the PWM Unit 207]

The PWM unit 207 will be explained using FIGS. 8A and 8B. In the case of image data that underwent a four colors separation into yellow (Y), magenta (M), cyan (C) and black (K) (single color in the case of MFP 105) and exited the core unit 206, each goes through respective PWM unit 207 and an image is formed for each. Numeral 801 is a triangular wave generation unit, numeral 802 is a D/A converter which converts the digital image signal into an analog signal. A signal from the triangular wave generation unit 801 (signal a in FIG. 8B) and a signal from the D/A converter 802 (signal b in FIG. 8B) are compared in a comparator 803 and are sent in a form such as a signal c to a laser drive unit 804, and each CMYK is converted to laser beam with each CMYK laser 805.

Then, a polygon scanner (mirror) 913 scans each laser beam and exposes each photosensitive drums 917, 921, 925 and 929.

[Structure of the Printer Unit 208 (in the Case of Color MFP 104)]

Figure 9:
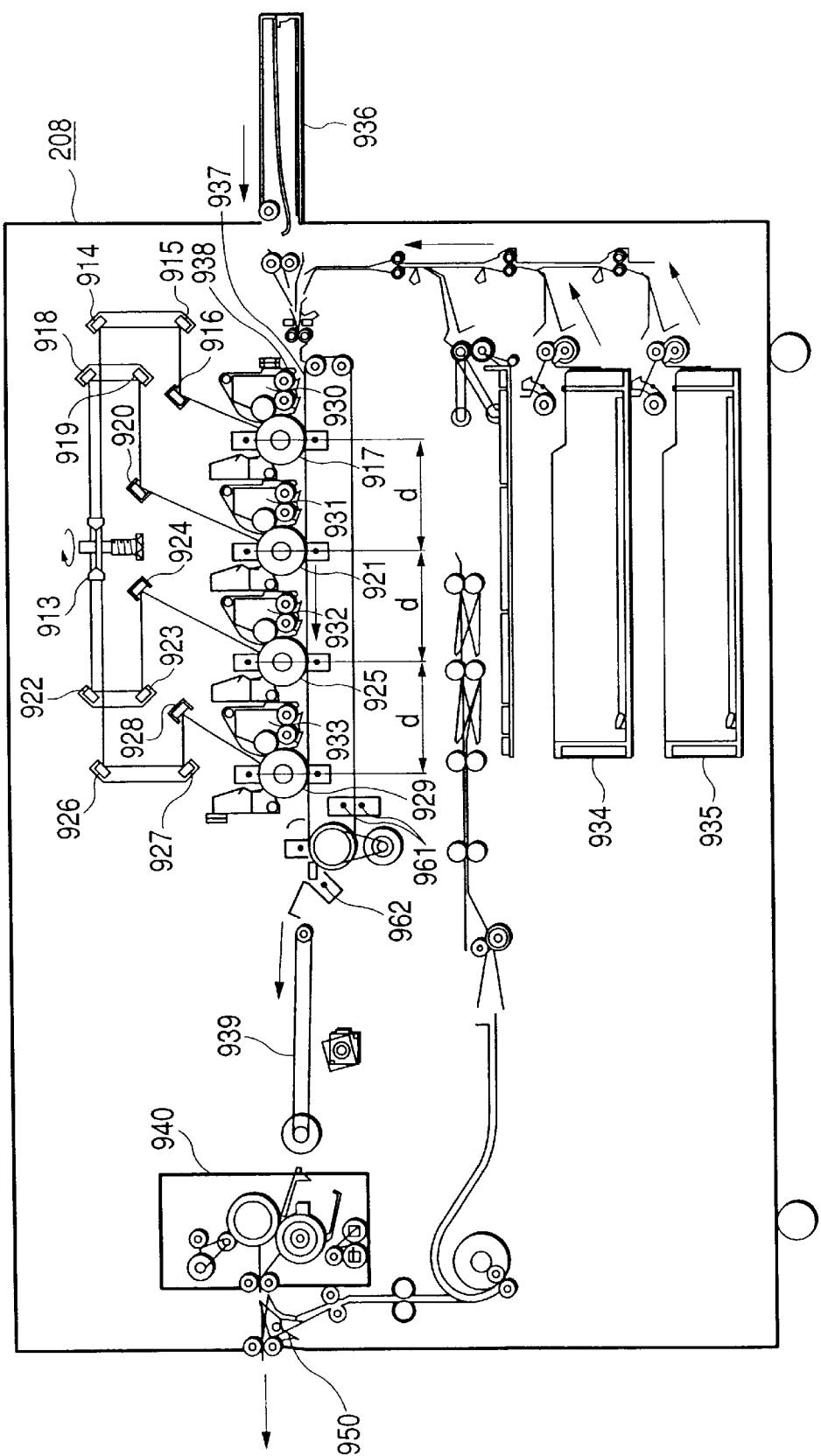
FIG. 9 is a view showing a printer unit of a color image formation apparatus.

FIG. 9 shows the outline of the color printer unit. Numeral 913 is a polygon mirror and receives four laser beams emitted from four semiconductor lasers 805. One among them scans the photosensitive drum 917 via mirrors 914, 915 and 916, the next one scans the photosensitive drum 921 via mirrors 918, 919 and 920, the next one scans the photosensitive drum 925 via mirrors 922, 923 and 924, the next one scans the photosensitive drum 929 via mirrors 926, 927 and 928.

On the one hand, numeral 930 is a development unit which supplies yellow (Y) toner creating a yellow toner image on the photosensitive drum 917 following the laser beam, numeral 931 is a development unit which supplies magenta (M) toner creating a magenta toner image on the photosensitive drum 921 following the laser beam, numeral 932 is a development unit which supplies cyan (C) toner creating a cyan toner image on the photosensitive drum 925 following the laser beam, numeral 933 is a development unit which supplies black (K) toner creating a black toner image on the photosensitive drum 929 following the laser beam.

The above four colors (YMCK) toner images are transferred to the sheet, providing a full color output image.

Sheets paper-fed from either sheet cassettes 934 or 935, or a manual loading tray 936, are, via a resist roller 937, absorbed to a transfer belt 938, and conveyed. Synchronized with the paper-feeding timing, each color toner is developed in advance on the photosensitive drums 917, 921, 925 and 929, and while the sheets are being conveyed, the toner images are transferred onto the sheets. The sheets on which each color toner image has been transferred are separated, conveyed by a conveying belt 939 and the toner is fixed onto the sheets by a fixing unit 940. The sheets which exited the fixing unit 940 are discharged. In this manner, since the sheets are discharged face-up, the printing is performed successively from the end page.

Further, the four photosensitive drums 917, 921, 925 and 929 are separated by a distance d and positioned at each interval, the sheets are conveyed by the conveying belt 939 at a constant speed V such that the above timing synchronization is achieved to drive the four semiconductor lasers 805.

[Structure of the Printer Unit 208 (in the Case of the Monochrome MFP 105)]

Figure 10:
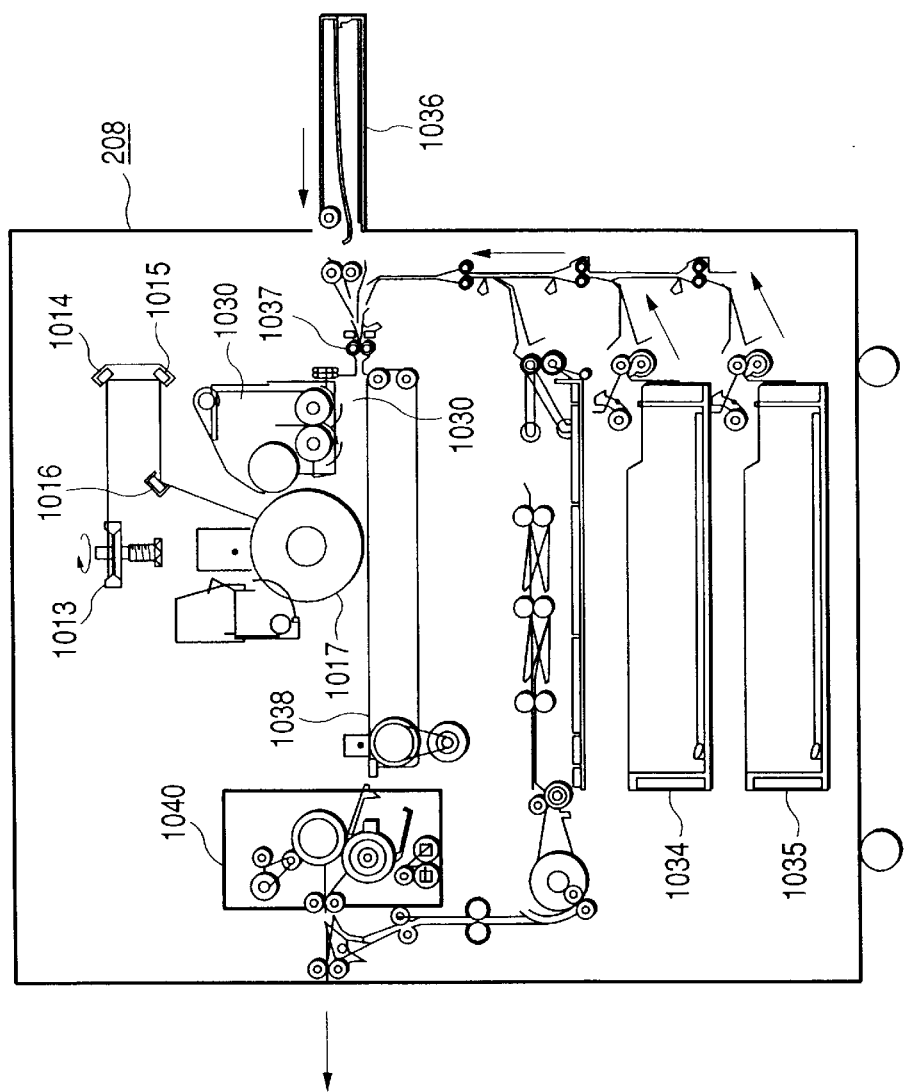
FIG. 10 is a view showing a printer unit of a monochrome image formation apparatus.

FIG. 10 shows the outline of the monochrome printer unit. Numeral 1013 is a polygon mirror and receives the four laser beams emitted by the four semiconductor lasers 805. The laser beams scan a photosensitive drum 1017 via mirrors 1014, 1015 and 1016. On the one hand, numeral 1030 is a development unit which supplies black and white toner creating a toner image on the photosensitive drum 1017 following the laser beam, the toner image is transferred to the sheet, providing an output image.

Sheets paper-fed from either sheet cassettes 1034 or 1035, or a manual loading tray 1036, are, via a resist roller 1037, absorbed to a transfer belt 1038, and conveyed. Synchronized with the paper-feeding timing, the toner image is developed in advance on the photosensitive drum 1017, and while the sheets are being conveyed, the toner images are transferred onto the sheets. The sheets on which the toner images have been transferred are separated, and the toner is fixed onto the sheets by a fixing unit 1040. The sheets which exited the fixing unit 1040 are discharged. In this manner, the sheets are discharged face-up, the printing is performed successively from the end page.

[Structure of the Display Unit 210]

Figure 11:
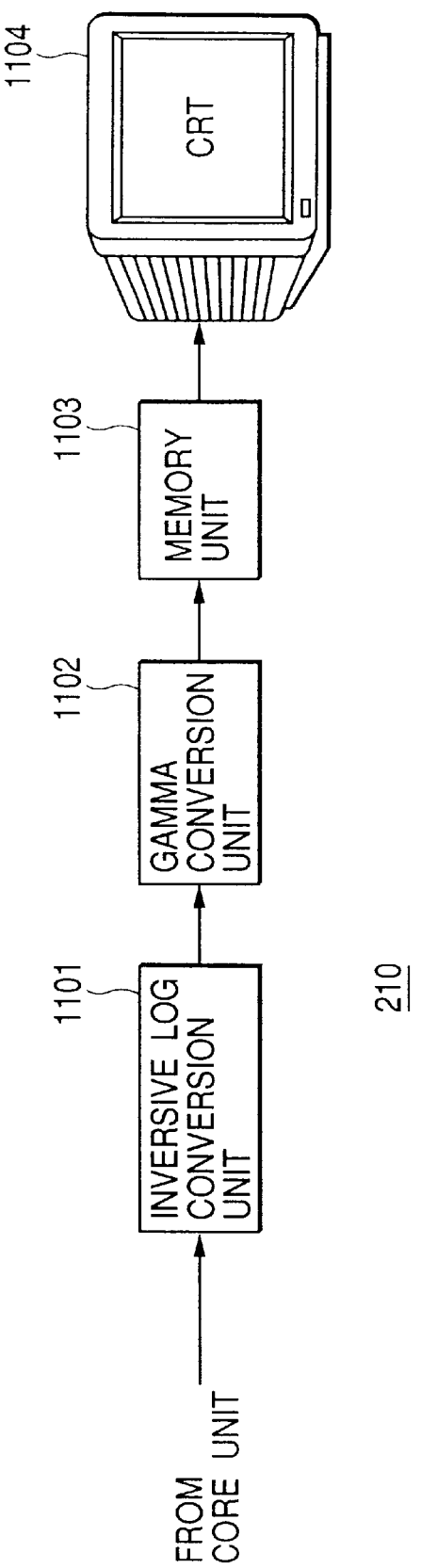
FIG. 11 is a block diagram of a display unit of the image formation apparatus.

The display unit 210 is shown in FIG. 11. Since the image data outputted from the core unit 206 is CMYK data, it is necessary to perform a transformation into RGB data with an inversive LOG conversion unit 1101. Then, using a look up table in a gamma conversion unit 1102, an output conversion is performed to conform to color characteristics of outputting display unit 1104 such as CRT or the like. The converted image data is temporarily stored in a memory unit 1103 and displayed by the display unit 1104 such as CRT or the like.

Here, the display unit 210 is used for a preview function, to verify in advance the images to be printed, a proofing function, to confirm that the images are the ones intended to be printed, or for preventing waste of sheets by verifying the images that do not need to be printed.

[Structure of Sorter Unit 211]

Figure 12:
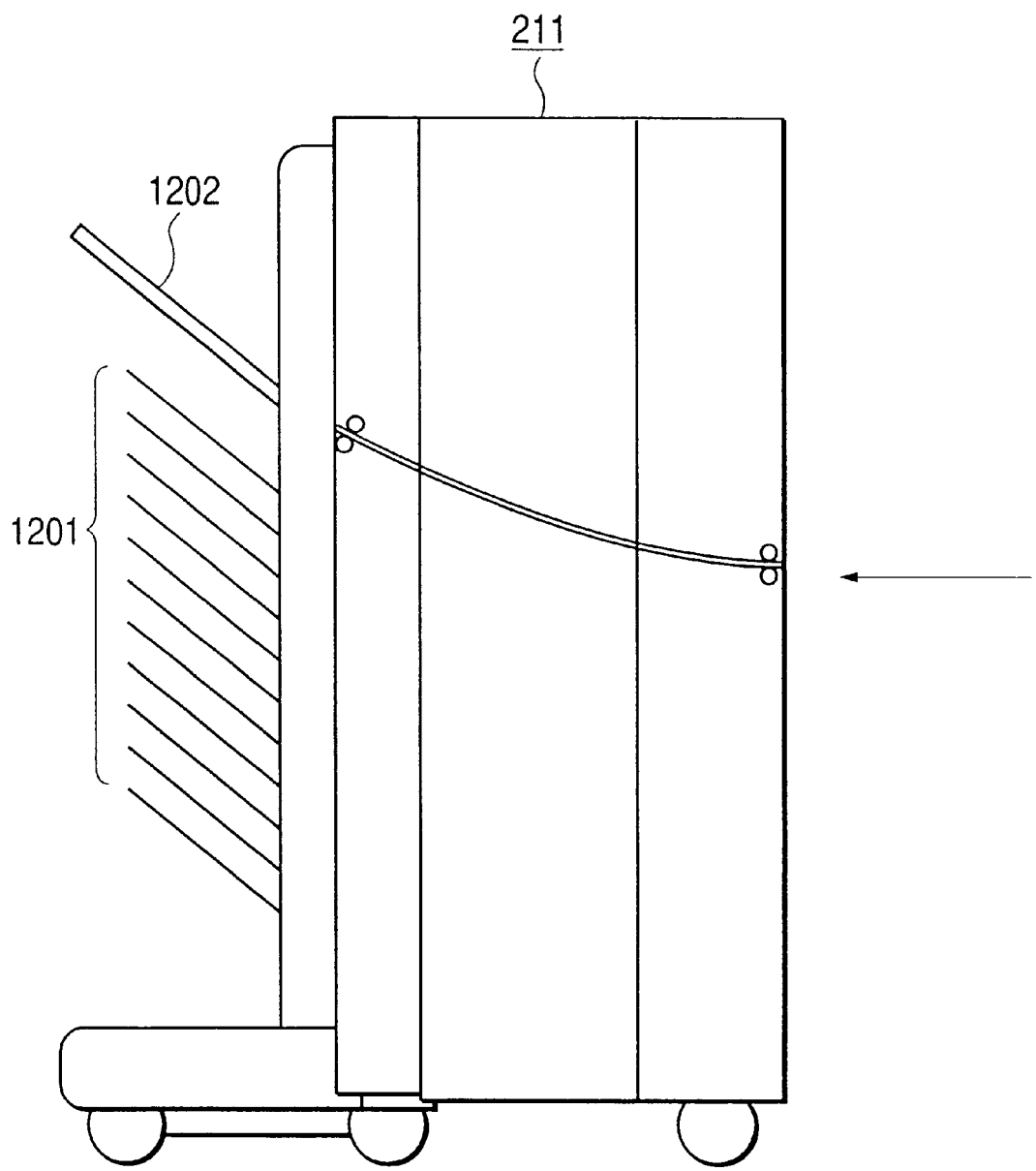
FIG. 12 is a view showing a sorter unit of the image formation apparatus.

The general outline of a sorter 211 is shown in FIG. 12. The sheets printed by the printer unit 208 are sent to the sorter 211 and discharged into either a non-sort bin 1202 or a sort bin 1201 according to the job type.

In this case, discharge to either sort bin may be separated according to pages in the job, the copy number, a color or black/white output, a format of the job or an OS type of the client computer 102. Further, according to outputs of sensors in each respective sort bin not shown in figure, which monitor the presence or the absence of papers (sheets), or which monitor the amount of papers, discharge avoiding the bins which are crowded.

[Structure of Collator 106]

Figure 13:
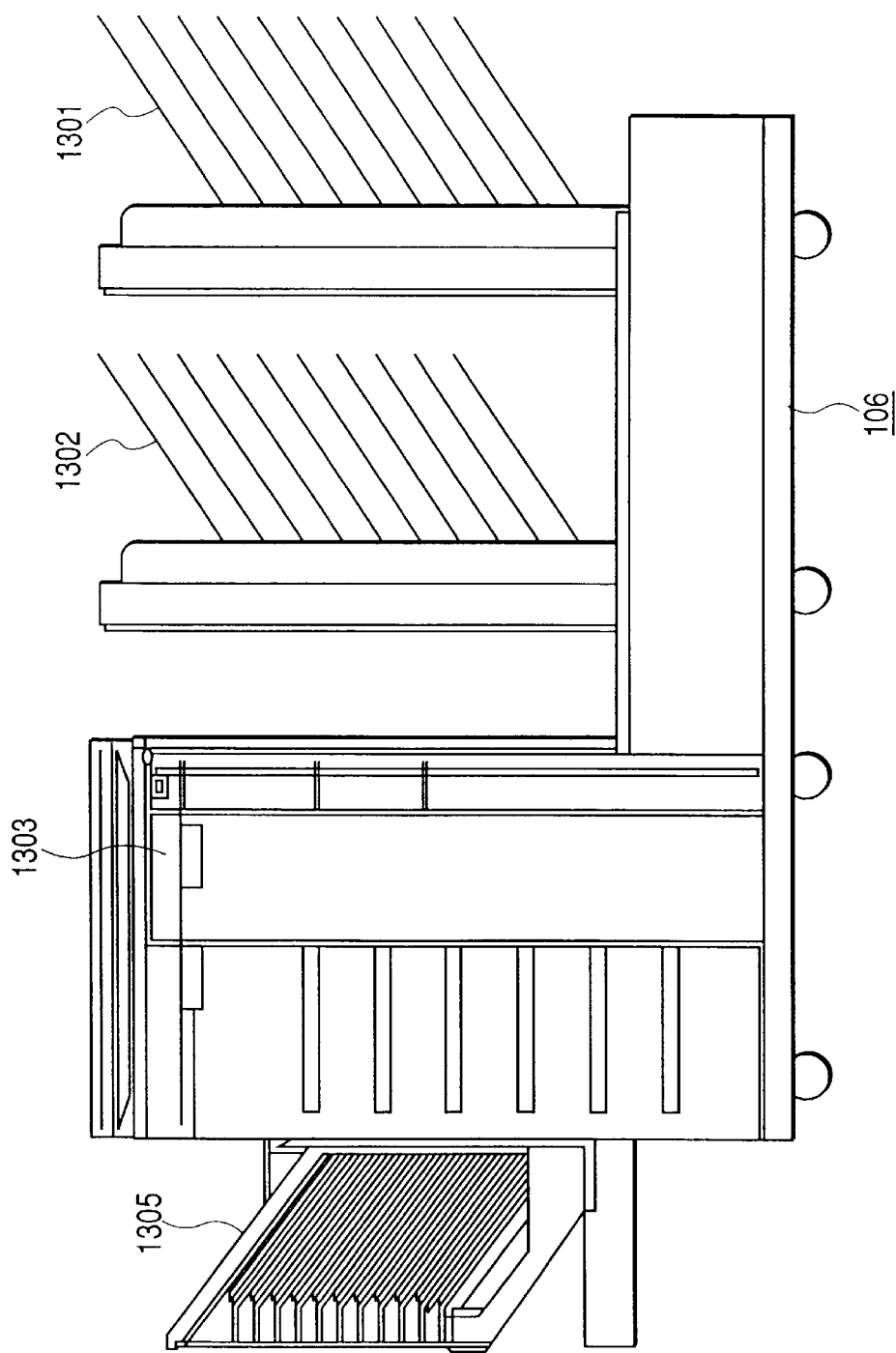
FIG. 13 is a view showing a collator.

The general outline of a collator 106 is shown in FIG. 13. The collator 106 is constituted by input bin units 1301 and 1302 which set the sheaf of sheets discharged by the color MFP 104 and the black/white MFP 105, a finishing unit 1303 which adds a finishing process to the sheets fed by the input bin units 1301 and 1302, and a sort bin unit 1305 which separates the prepared sheaf of sheets for each job.

Figure 14:
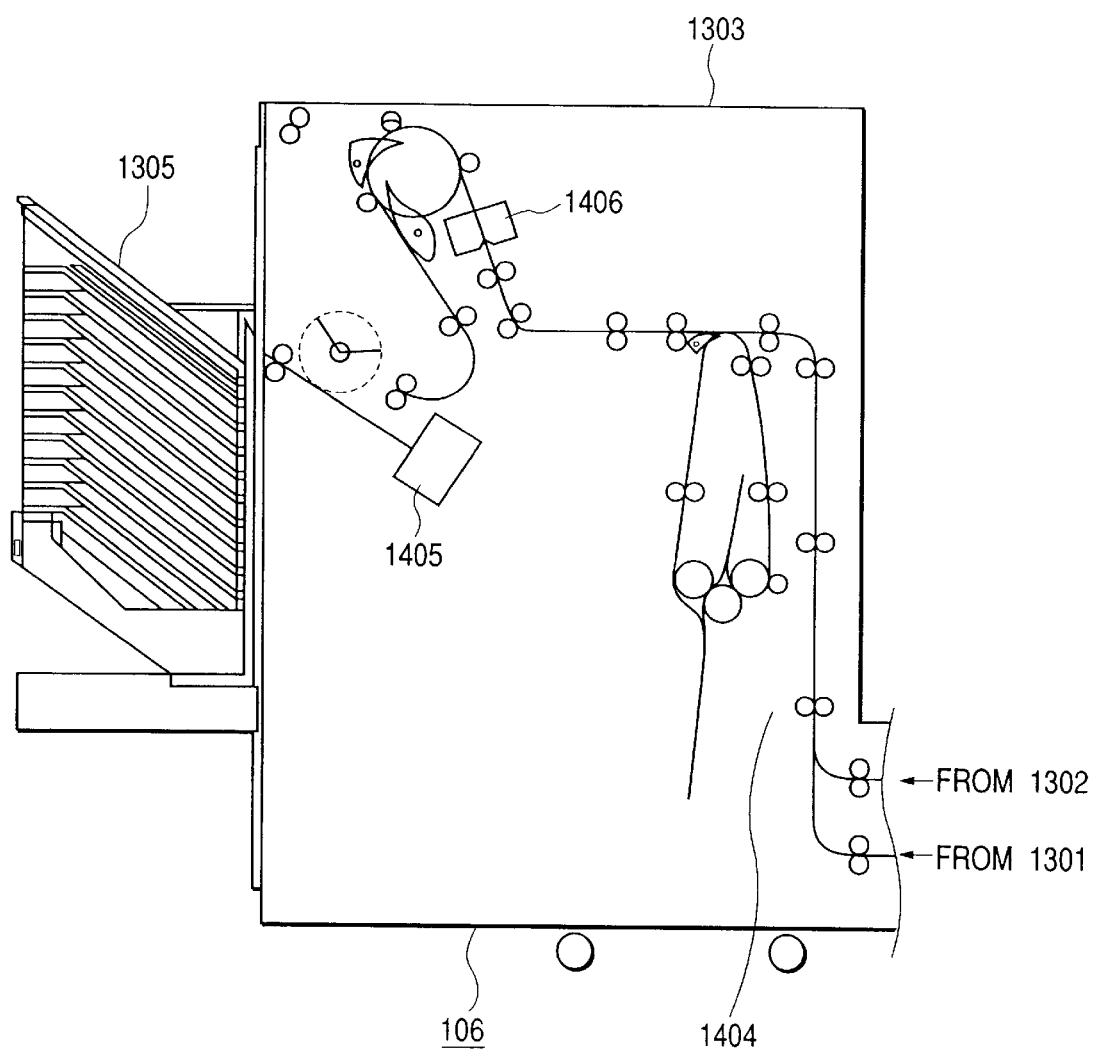
FIG. 14 is a view showing a finisher unit of the collator.

FIG. 14 is a view which explains the finishing unit 1303. The finishing unit 1303 can store the sheets for each job before the sheets are discharged to the sort bin unit 1305, and bind with a stapler 1405 immediately before discharging.

In addition, a Z-folding apparatus 1404, which folds the papers into the Z-letter-shape, and a puncher 1406, which punches two (or three) holes for files, perform processing according to the job type.

In addition, although not shown in the figure, it is possible to consider adding binding with glue used to make books, or cutting of the bound or the opposite edge to make them uniform.

[Separation of Jobs]

In the following, the separation of jobs between the color image and monochrome image will be explained. When printing a job from the computers 103 and 102, where color pages and black/white pages coexist inside one job, the job is first transferred to the color MFP 104 through the network 101, using a software driver running on the computers 102 and 103 as in FIG. 13. Here, numeral 1501 is a driver window shown on the displays of the computers 102 and 103, in which the setting items are as follows: numeral 1502 is a color printer selection column where selection of the color printer (color MFP 104) is performed, numeral 1503 is a monochrome printer selection column where selection of the monochrome printer (black/white MFP 105) is performed, numeral 1504 is a page setting column which selects the output pages in a job, numeral 1505 is a copy number setting column which designates the number of copies, numeral 1506 is a job color mode column which instructs the separation of color and black/white images for jobs where color coexist with black/white, numeral 1507 is an OK key which starts the printing, numeral 1508 is a cancel key which abandons the printing and numeral 1509 is a property key which performs additional detailed settings.

Here, the job color mode column 1506 is capable of selecting one mode among automatic separation, manual separation, all color pages or all black/white pages. In the case of manual separation, for each page, the user can select from which MFP (color MFP 104 or black/white MFP 105) to discharge.

[Automatic Separation of Jobs and Judgment Between Color and Black/White]

Figure 16:
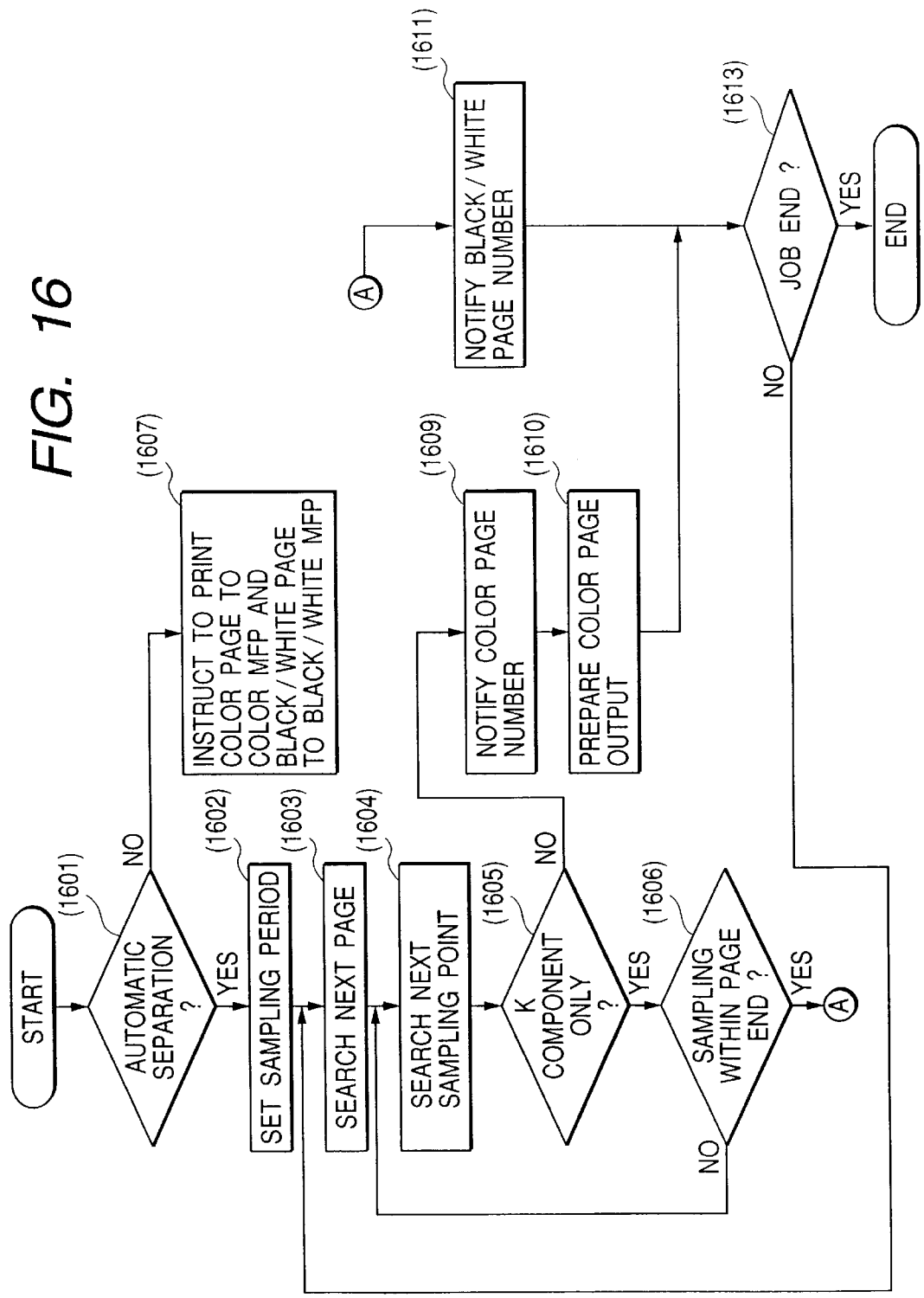
FIG. 16 is a flow chart of a color and black/white pages separation process.

In the following, the automatic separation will be explained using FIG. 16. When the OK key 1507 is pressed in the driver window 1501, the driver on the computer 103 sends the information indicating that the job has coexisting color pages and black/white pages and the print job to both of the color MFP 104 and the black/white MFP 105, through the computer (server) 102. In the case of the automatic separation, since it is not possible at this point to judge which pages are black/white pages, the job content for all pages are sent to each of the color MFP 104 and the black/white MFP 105. (That is, the identical data content are transmitted to both). The sequence by which the color pages and the black/white pages are sent can be in the order of the color MFP then the black/white MFP with a time offset, or it is indifferent to send them simultaneously to both MFP's.

Further, the black/white MFP, when receiving information indicating that color pages and black/white pages coexist in the job, does not start printing immediately but awaits a notification of the black/white page number from the color MFP 104.

Figure 15:
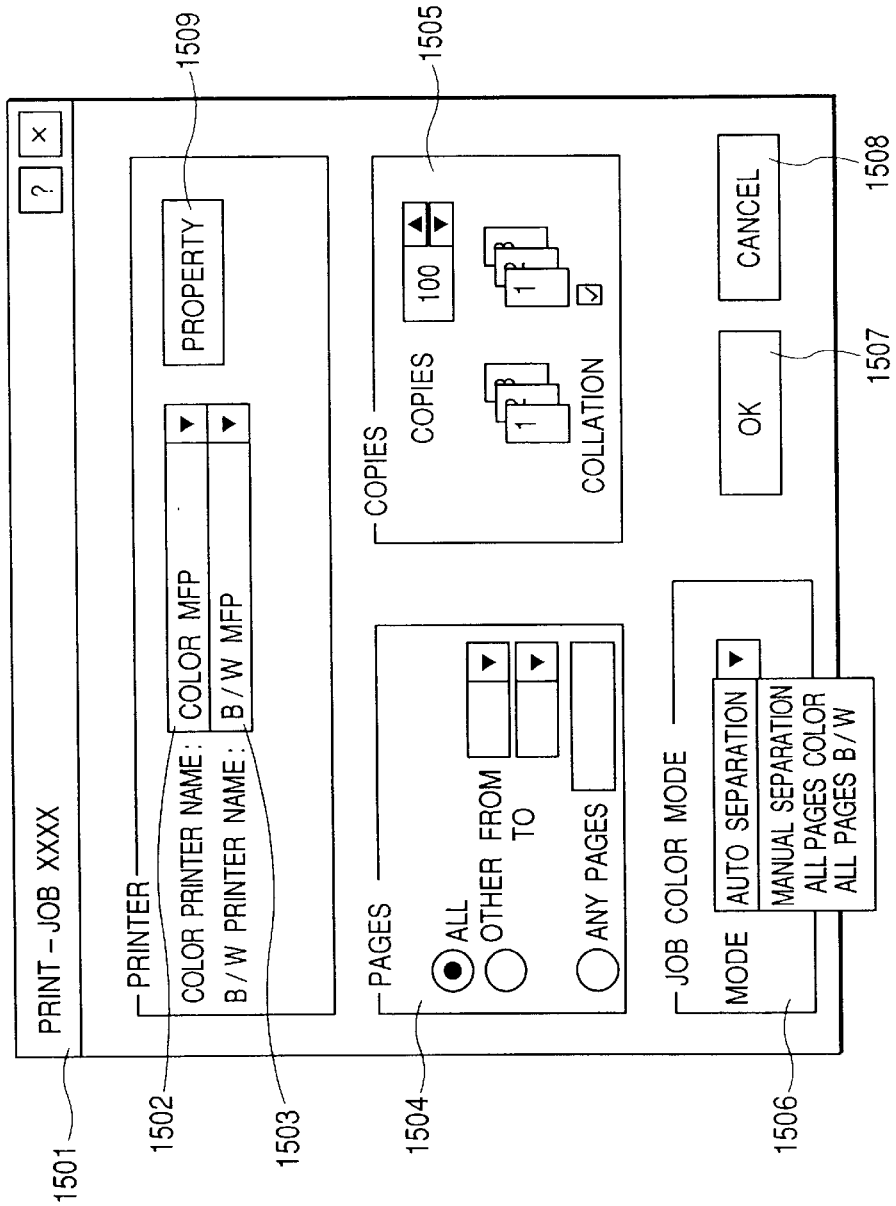
FIG. 15 is a view showing a screen example of a printer driver.

Then, if the job is set to the automatic separation (Auto Separation)(step 1601), the setting content of the sampling cycle is sent to the color MFP 104 (step 1602). However, the setting of the sampling cycle is performed in advance in the detailed setting window called with the property key 1509 on the display shown in FIG. 15. Regarding the sampling cycle, by sampling with a ratio of one point per 100 pixels×100 lines, the sampling time is complete in 1/10000, for a 400 dpi image, considering sampling with a lattice unit of 0.25 inch (=6.35 mm) cycle, even of a letter size (11"×8.5") sheet, if close to 1500 point, judging between color and black/white is possible to some degree. In the case the images is still difficult to judge, the sampling cycle can be set to a finer value, or the job color mode column 1506 can be set to the manual separation (Manual Separation) and manually set which pages are in color and which are in black/white, in advance, in the detailed setting window.

Then, the PDL unit 205 of the color MFP 104 which received the job and the sampling cycle performs successively from the front page successive raster image processing (RIP), and after the RIP, the images are stored for each page unit and for each color component (CMYK) in the semiconductor memory 605. The CPU 603 then judges whether the stored images are in color or in black/white (step 1603). The judgment is performed by assessing the presence or the absence of components other than black (K) (CMY components) for each sample point in the semiconductor memory 605 (steps 1604 and 1605). While so doing, to increase the processing speed, if a color (CMY)component is present in a single sampling point of the page, since the page is a color image, the judgment between color and black/white is interrupted at that point in time and the page is processed as a color page inside the color MFP 104. At this point, the possibility exists, to reprint the job, so the page number information of the page, together with the information that the page is a color page is used to notify the server 102 through the network 101 (step 1609). Then, the page is color printed in the color MFP 104 (step 1610). Further, the server 102 records and manages each page number information to be able to output at any time in response to re-outputting request from an user.

In the step 1609 or 1610, the color MFP 104 stores the page number of the color pages in the job because of printing bar codes to be described later.

In the step 1605, if the color (CMY) components do not exist even for a single point in the sampling points in the page, the page is to be processed as a black/white page, and the page number information together with information indicating that the page is the black/white page are used to notify the server 102 and the black/white MFP 105, through the network 101 (step 1611).

The black/white MFP 105 which received notification in the step 1611 RIP develops only the notified pages to perform the print. The black/white MFP 105 also stores the page number of the black/white pages because of printing bar codes to be described later.

The job is repeated until the front page from the step 1603 to a step 1606 and from a step 1609 to a step 1611, and finished (step 1613) by the MFP 104, as long as the interruption by job cancel is not inserted.

In the step 1601, if it is judged that the automatic separation is not set, that is, if it is judged that the manual separation is set, the computer (server) 102 receives information of whether each page is in color or in black/white from the driver and responds by instructing to the color MFP 104 to print the color pages and by instructing to the black/white MFP 105 to print the black/white pages (step 1607). Then, the color MFP 104 prints the color pages and the black/white MFP 105 prints the black/white pages.

Further, in the above-mentioned explanation, the explanation is given when the rasterizing is performed sequentially for each page but it is indifferent to temporarily RIP develop an entire job in the high capacity memory (HDD) 604 and sequentially read back and judge each page or several pages in the semiconductor memory 605.

This allows color pages to be printed by the color MFP 104 and the black/white pages to be printed by the black/white MFP 105 from jobs where color pages and black/white pages coexist.

In addition, the above-mentioned automatic separation of the jobs is a separation based on color and black/white, but separation can also be based on a unit of predetermined number of copies, or separation can also be based on photograph pages and character pages.

[Bar Codes Add-on]

Figure 17:
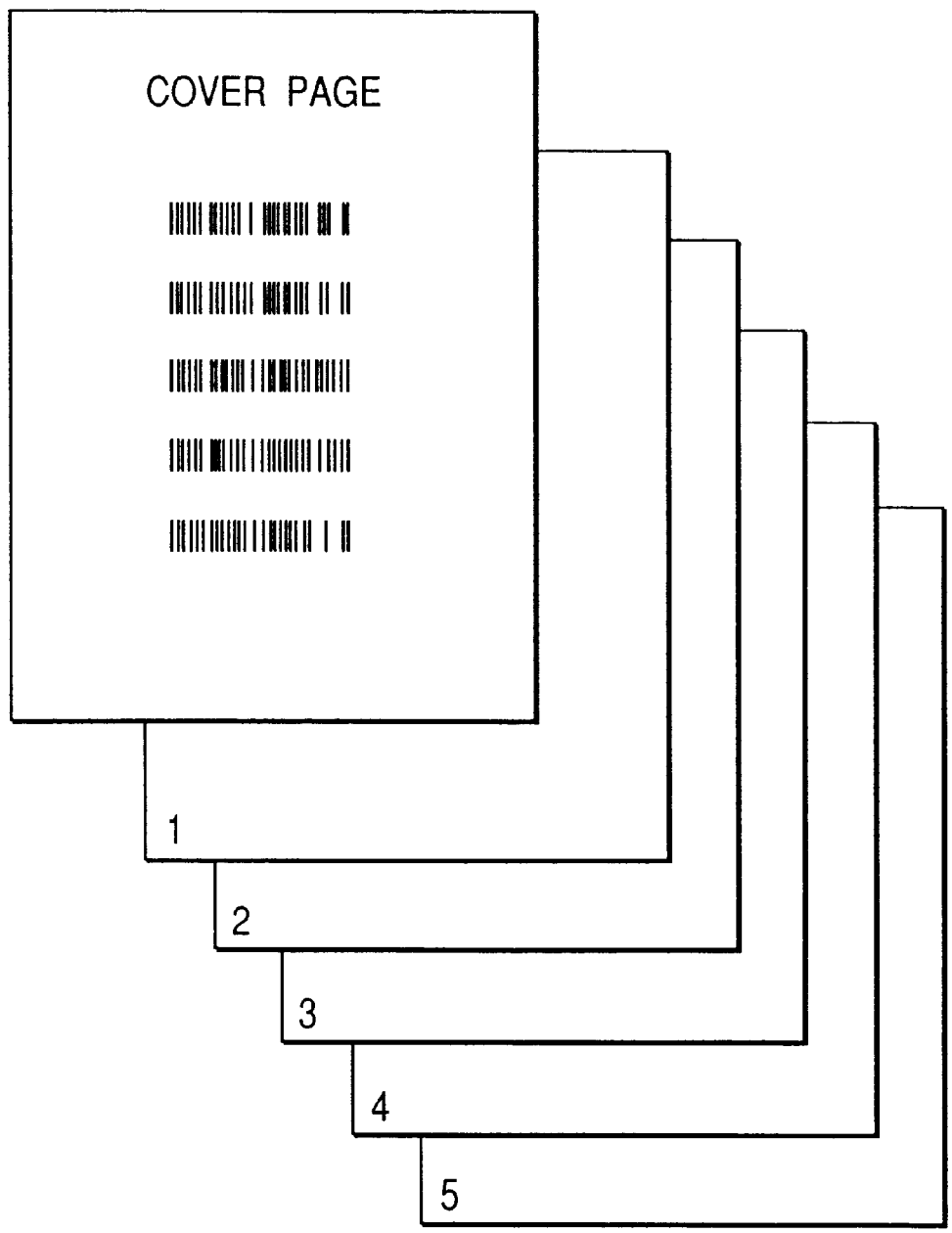

When the color MFP 104 and the black/white MFP 105 print the jobs, a cover page with bar codes add-on as shown in FIG. 17 is added to the topmost part of the job sheaf (corresponding to the image formation processed group of sheets) and outputted. The bar codes indicate finishing process information for the collator 106 such as the job number, the page number resulting from the color and black/white judgment, page order information (collate, group etc).

The cover page of the bar codes added-on is added to all the separately outputted job sheaves and outputted by the color MFP 104 and the black/white MFP 105. In this case, the separation is clearer if, in order to store some of the jobs, the sorter unit 211 is utilized to switch the sorter bin 1201 for each job (job separation mode), separate and put each job in predetermined bin (mail bin mode) for each user or job, put the job sequentially in a next bin when the bin is full (stack mode).

In addition, the generation of the bar code is done by the PDL unit 205, when in the face-down page configuration, is outputted as a sort of banner page before the job's print out. In the case the paper configuration is face-up, the bar code is printed after printing of the job. Information such as the job number should be determined uniquely by modifying the line width and intervals of the bar code.

[Automatic Mixing of Jobs]

The mixing of the jobs will be explained. Each sheaf of sheets printed by the color MFP 104 and the black/white MFP 105 and discharged into each bin 1201 of the sorter unit 211 is set by the user to each empty bin of the input bins 1301 and 1302 of the collator 106. Then, when start is ordered by the server 102 or the client computer 103, the collator 106 reads the bar codes on the cover pages of the job sheaves set in the input bins 1301 and 1302 at once and discriminates from which input bin a sheaf of sheets should be taken to be mixed with the sheaf of sheets from which input bin, in which page location to place it, and what type of finishing process is performed.

The collator 106 sequentially paper-feeds the job sheaf from the input bin according to results of the discrimination, produces a mixed job sheaf and discharges to any of the sorter bin 1305.

In addition, in case multiple copy outputs are to be produced according to the above-mentioned method, it is indifferent to use the color MFP 104 and the black/white MFP 105 to output, for example, in the order (1,1,1,2,2,2, 3,3,3) (that is, group mode output) or in the order (1,2,3,1, 2,3,1,2,3) (that is, sort mode output). However, the order and the copy number information should be indicated in the bar codes and the collator 106 should be set for mixing or separation accordingly. Thus, by differentiating the bar code information following the order of image formation (image formation mode set by the user) by the MFP's, the collator performs a mixing process following the mixing order based on the information. In other words, if the mode is different, the mixing method by the collator is also different.

[Explanations of Network Utility Software]

The utility software which runs on the computers 103 and 102 will be explained. A standardized database called MIB (Management Information Base) is built in the network interface parts (NIC unit 204 and PDL unit 205) of the MFP's 104 and 105 and by communicating with the computers on the network through a network management protocol called SNMP (Simple Network Management Protocol), the MFP's 104 and 105 to begin with, scanners, printers, FAXes or the like connected to the network can be managed.

On the other hand, software programs called utilities are running on the computers 103 and 102, and by using the MIB with the above-mentioned SNMP through the network, the needed information can be exchanged.

For example, information about the MFP's 104 and 105 connected to the user network can be identified on the computers 102 and 103, such as detecting whether the sorter 211 is connected or not as equipment information of the MFP's 104 and 105, detecting whether printing is currently possible or not as status information, recording, changing or identifying the names or the localizations of the MFP's 104 and 105, and so on. Further, restriction the reading/writing of the information can be provided by distinguishing the server 102 and the client 103.

Therefore, by using the function, the user can access all sort of information such as the equipment information of the MFP's 104 and 105, the status of the apparatus, the setting of the network, the position of the job, the management and control of the user environment and the like.

[Explanations of GUI]

Figure 18:
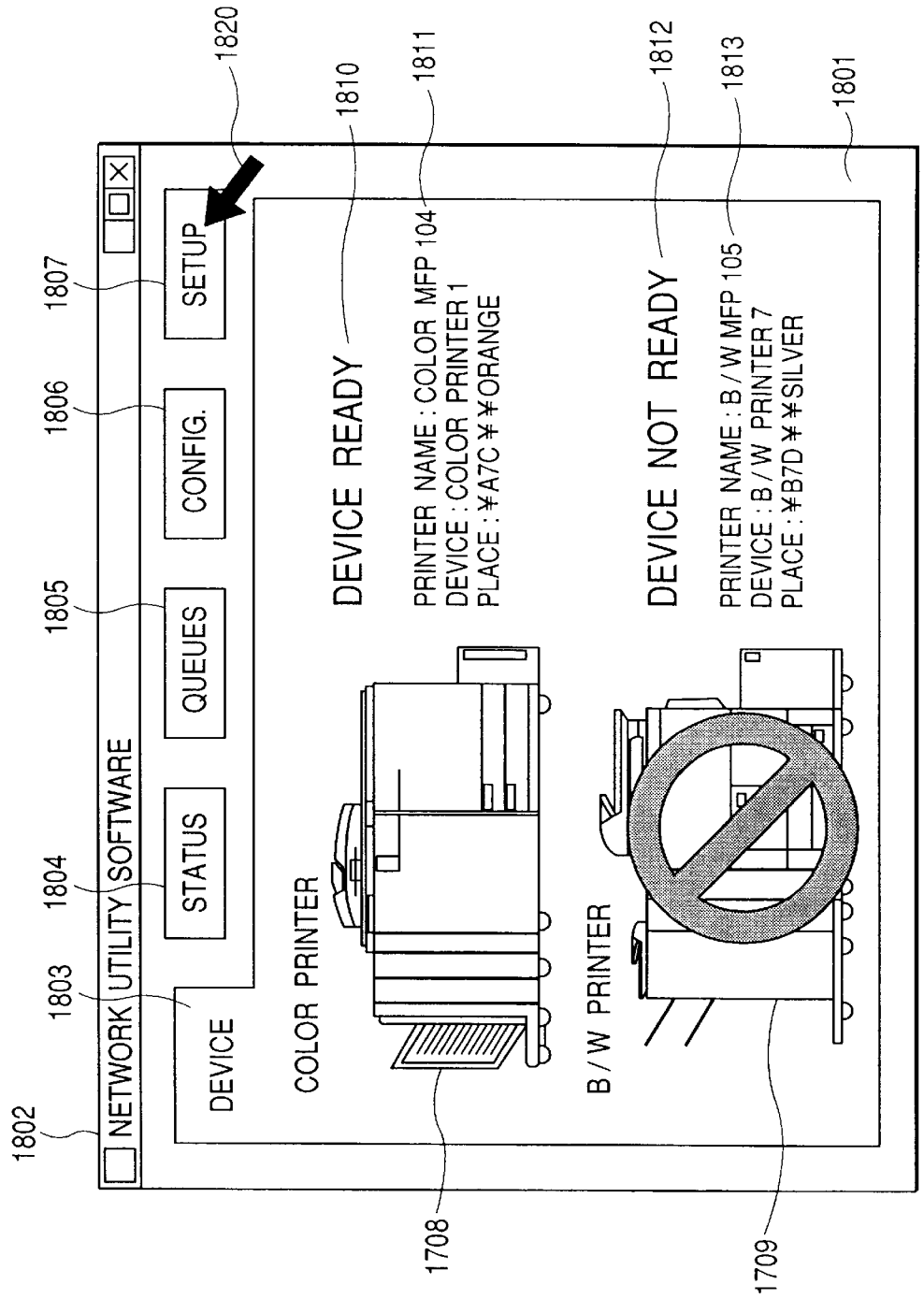
FIG. 18 is a view showing a screen example of utility software.

In the following, the graphic screen of an utility software called GUI (Graphic User Interface) which runs on the computers 103 and 102 will be explained using FIG. 18. When running an utility software on the computers 103 and 102, a graphic screen such as the one in FIG. 18 is shown. Here, numeral 1801 is a window, numeral 1820 is a cursor which when clicked with a mouse opens another window or switched to the next status.

Numeral 1802 is called a title bar and is used to show the level or the title of the current window. Each numeral from 1803 to 1807 is called a tab and is arranged according to its type, allowing to watch or select necessary information.

Here, the numeral 1803 is called a device tab and allows to know the presence of the device and its outline. Bitmap images such as numerals 1808 and 1809 showing the MFP's 104 and 105 are in the device tab and messages 1810 and 1811 show what states of the MFP's are. A mechanism consisting in watching a status tab 1804 allows to know the details of the states of the apparatus. Then, numeral 1805 is a queue tab and allows to inquire and know the states of the jobs queued in each apparatus or how crowded the devices are.

Then, a config tab 1806 allows to know the equipment information such as which functions the installed finisher has. For examples of such information are: a finisher is installed on the MFP 105 and functions possessed by the finisher are stapler, saddle stitcher, folding apparatus, punching apparatus, inserter, a paper deck is installed that can receive up to 5000 sheets and what the remaining quantity of the sheets; a unit to process both sides is installed, and so on.

A setup tab 1807 allows to know network setting information of the apparatus.

[Alternate Structure of the Bar Code Printing]

In the above-mentioned example, the bar code is added to each job processed in separation mode (refer to FIG. 17). However, in the event multiple feed or jamming occurs in the collator 106, the page order may become wrong or considerable loss may follow if the collator 106 is set to perform binding process such as stapling at once.

Figure 19:
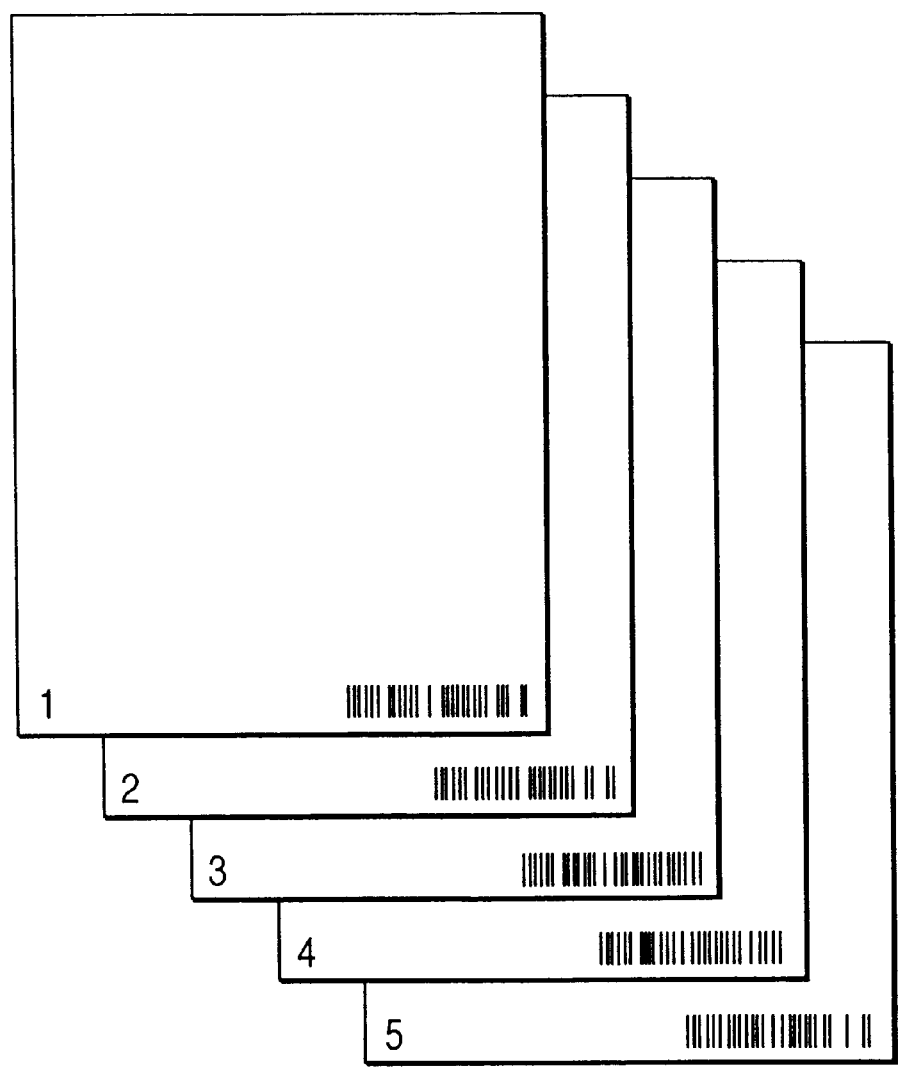
FIG. 19 is a view showing a state that the bar codes are added on each of pages.

Therefore, as shown in FIG. 19, the bar code is printed for each page, and the collator is set to perform the mixing by identifying the bar code. The printing is performed in the form of an add-on to the image data by the PDL unit 205 as mentioned above.

[Network Clustering]

Moreover, with this method, in addition to the color and black/white mixing, the mixing among the several black/white MFP's 105, or among the several color MFP's 104 connected to the network may be realized.

Figure 20:
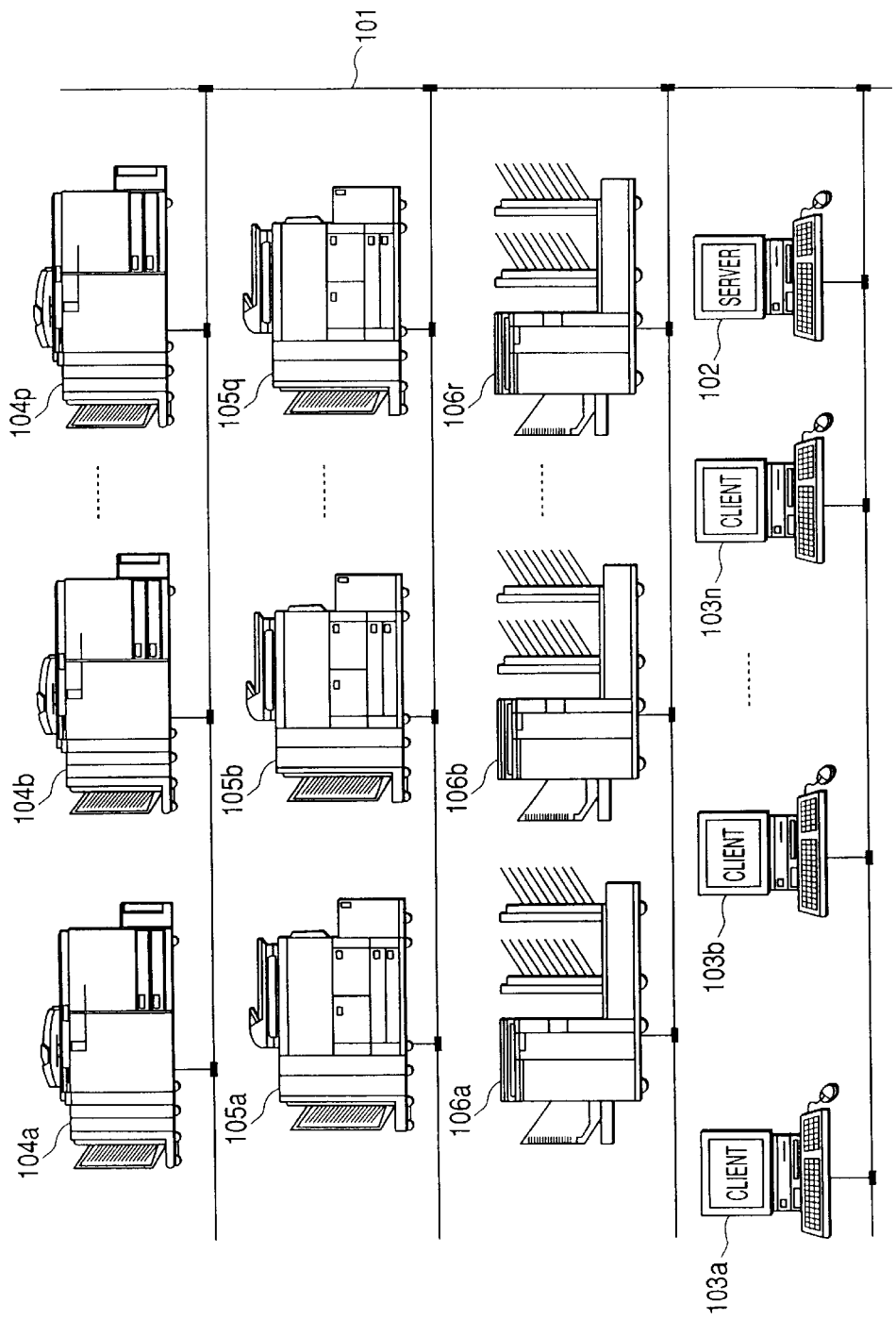
FIG. 20 is a view showing an image formation apparatus of another embodiment.

In other words, even in a system, as shown in FIG. 20, where several color MFP's 104 (104$a$, 104$b$, . . . , 104$p$) and several MFP's 105 (105$a$, 105$b$, . . . , 105$q$) are connected to the network 101, and several collators 106 (106$a$, 106$b$, . . . , 106$r$) are also connected, if every separation job has a cover page with the bar code add-on (or if every page has a bar code copy), whichever the bin and MFP the job is discharged from, if each job sheaf is loaded in any one input bin of the collator and the process is started, mixing, finishing and stacking (or sorting) can be performed at once.

Using the above method, separation by page as well as separation by copy are possible, demonstrating the power of this method in the speeding-up of the process, in the event of massive printing.

[Multiple Types of OS and Multiple Types of Formats]

In a system shown in FIG. 20, even if the clients 103 (103$a$, 103$b$, . . . , 103$n$) have, for example, different types of OS (Operating System), if each job has a cover page with the bar code add-on (or, if each page has a copy of the bar code), a page mixing is possible, whichever the bin and MFP the job is discharged from.

Moreover, the page mixing is also possible even if each job has image file format types such as pdf (portable document format), tiff (tagged image file format) or gif (graphic interchange format), and the page mixing is also possible for different types of PDL (Page Description Language) such as PS (Post Script) or PCL, or even if the MFP's 104 and 105 have only one of PDL interpreters.

For example, referring to FIG. 20, an image in the tiff format outputted by the computer 103$a$ is printed by the MFP 104$a$, an image in the pdf format outputted by the computer 103$b$ running a different OS is printed by the MFP 104$b$. Then, each MFP also prints out the bar code showing the page information and the job information used to gather the different images into one group. Then the user sets the sheaves of sheets printed by each MFP to the collator 106$a$. The collator 106$a$ reads the bar code and mixes each sheaf of sheets with the image formed from the different jobs as one group of sheaf.

Thus, in the event of mixing into one group, each sheet with different images from several computers running different OS, or several images with different formats, the load for the user can be decreased.

As explained above, according to the present embodiment, in the image formation system consisting of several image formation apparatuses such as the MFP's or the like connected to the network, the jobs outputted by the computers connected to the network is separated by page unit following the predetermined separation rules. Each page of the respective separated job is processed for image formation by the several image formation apparatuses mentioned above, predetermined information is added to each of the separated sheets to be processed for image formation. The mixing of sheets being performed following the added information, the image formation of the image formation job can be performed faster than when using one image formation apparatus, and, even by performing image formation using several image formation apparatuses, the sheets from the original job can be obtained as one sheaf. Thus, the production of image formation is improved by an easy operation.

In addition, according to the present embodiment, in the image formation system consisting of one or several image formation apparatuses such as the MFP's or the like connected to the network, the jobs outputted by one or several computers connected to the network are processed for image formation by one or several image formation apparatuses. To each job sheet being processed for image formation, information is added in order to mix the sheets corresponding to several jobs into one group. Following the added information, the sheets corresponding to the formed images of several jobs are mixed into one group. Thus, in the event the respective sheets with formed images of several jobs from different environments are mixed into one group, the load for the user can be decreased.

In the following, another embodiment will be explained using FIG. 20 employed in the previous expression.

Referring to the outline of the system shown in FIG. 20, connected to the network 101 is the computer 102 which is the server and the computers 103a to 103n (n computer units) which are the clients. In the following, numeral 103 will be used to represent the clients.

In addition, the MFP's (Multi Functional Peripherals) 104 and 105 are connected to the network 101. As mentioned above, numeral 104 is the color MFP capable of full color scan, print and the like, several units are connected to the same network 101 and the numeral 104 will be used as a representative of numerals 104a to 104p (p MFP units). Numeral 105 is the black/white MFP performing monochromatic scan, print and the like, similarly, the numeral 105 will be used as a representative of numerals 105a to 105q (q MFP units). Numeral 106 is a collator and is a representative of numerals 106a to 106r (r collator units). Moreover, although not shown in the figure, apparatus other than the above-mentioned MFP's to begin with, such as scanners, printers, FAXes and the like are also connected.

Here, by running application softwares which perform so-called DTP (Desk Top Publishing) on the computer 103, all sort of texts/figures are created/edited. The computer 103 converts the produced texts/figures into PDL (Page Description Language) and sends them to the MFP's 104 and 105 via the network 101 for print out.

As mentioned before, as a mechanism to inform successively the computers 102 and 103 side, on the information and the status of the MFP's 104 and 105, the MFP's 104 and 105 respectively are provided with communication means which allow data exchange with the computers 102 and 103 through the network 101. Moreover, the computers 102 and 103 have utility softwares which function by receiving the information such that the MFP's 104a to 104p and the MFP's 105a to 105q can be managed by the computers 102 and 103.

Additionally, as mentioned before, the collator 106 is connected to the network 101 and is controlled through the network 101. When an user takes out the sheets printed by the color MFP 104 and the black/white MFP 105 and sets them to the collator 106, the collator 106 performs the mixing processing of the color and black/white pages, and the user can obtain a production configured by the order following the page order of the job.

Since the explanations of the structures of the MFP's 104 and 105 shown in the outline of the image formation system in FIG. 20 are identical to the ones explained using FIGS. 2 to 12, they will be omitted here. Also, concerning the structure of the collator 106, since it is identical to the one explained using FIGS. 13 and 14, it will be omitted here.

[Explanation of the Network Utility Software]

The utility software which runs on the computers 103 and 102 will be explained. A standardized database called MIB (Management Information Base) is built in the network interface parts (NIC unit 204 and PDL unit 205) of the MFP's 104 and 105 and by communicating with the computers on the network through a network management protocol called SNMP (Simple Network Management Protocol), the MFP's 104 and 105 to begin with, scanners, printers, FAXes or the likes connected to the network can be managed.

On the other hand, software programs called utilities are running on the computers 103 and 102, and by using the MIB with the above-mentioned SNMP through the network, the needed information can be exchanged.

For example, information about the MFP's 104 and 105 connected to the user network can be identified on the computers 102 and 103, such as detecting whether the sorter unit 211 is connected or not as equipment information of the MFP's 104 and 105, detecting whether printing is currently possible or not as status information, recording, changing or identifying the names or the localizations of the MFP's 104 and 105, and so on. Further, restriction the reading/writing of the information can be provided with by distinguishing the server 102 and the client 103.

Therefore, by using the function, the user can access all sort of information such as the equipment information of the MFP's 104 and 105, the status of the apparatus, the setting of the network, the position of the job, the management and control of the user environment, and the like.

[Explanation of GUI]

Figure 21:
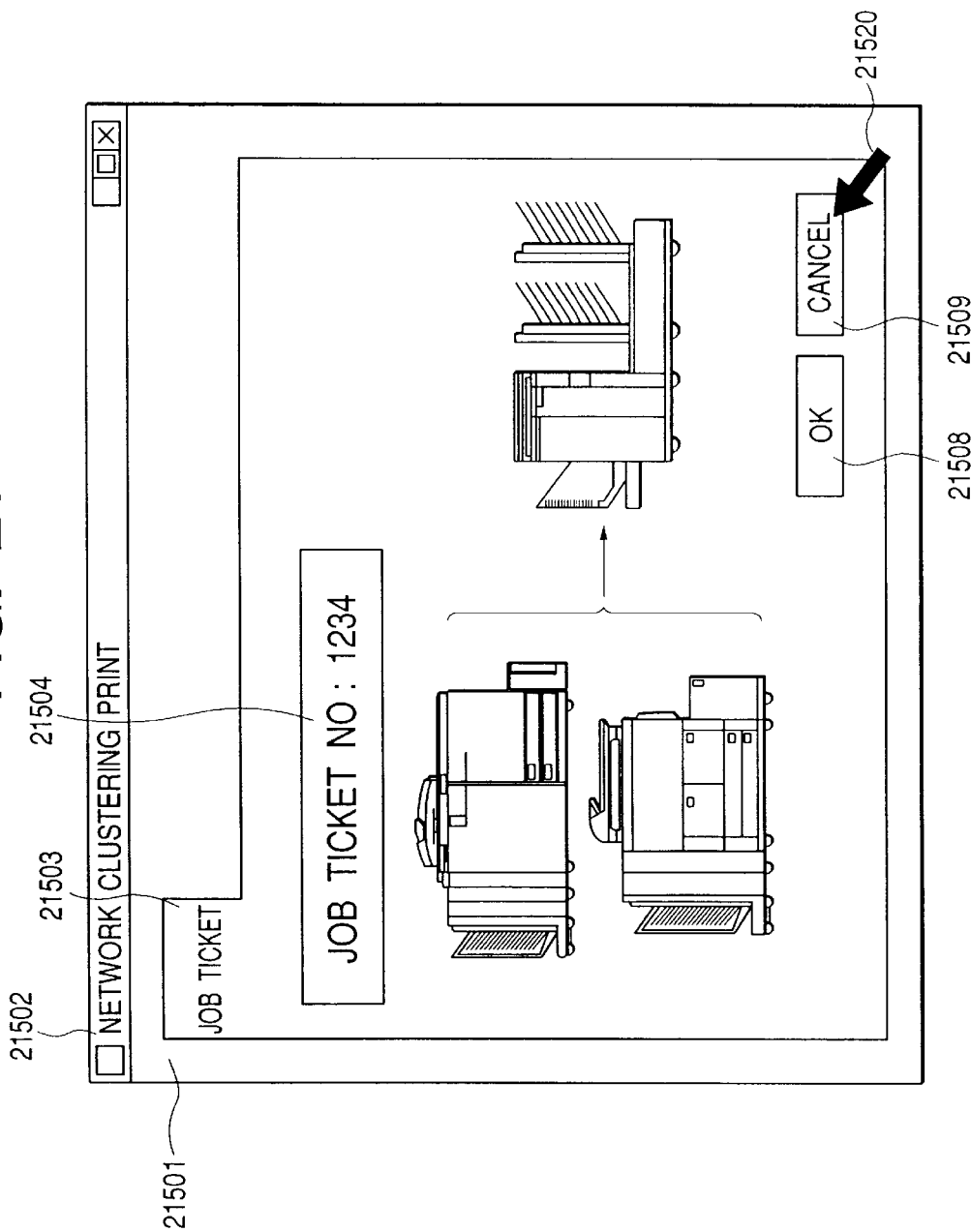
FIG. 21 is a view showing a screen example of a job ticket.

In the following, the graphic screen of the utility software called GUI (Graphic User Interface) which runs on the computers 103 and 102 will be explained using FIG. 21. When running the utility software on the computers 103 and 102, a graphic screen such as the one in FIG. 21 is shown. Here, numeral 21501 is a window, numeral 21520 is a cursor which when clicked with a mouse opens another window or switched to the next status.

The utility software is a program which can be read by the computers 103 and 102 and is recorded on hard disks, CD-ROMs or floppy disks, accessible to the computers 103 and 102.

Numeral 21502 is called a title bar and is used to show the level or the title of the current window. Numeral 21503 is called a tab and is arranged according to its type, allowing to watch necessary information or select necessary information.

[Job ticket]

Numeral 21504 is a job ticket number and the status of the series of operations to be started, the progress of its own job and logging information are managed using this number. In addition, the job ticket number is assigned automatically upon opening of the window and from then on, an operator performs operations according to the job ticket number.

Figure 22:
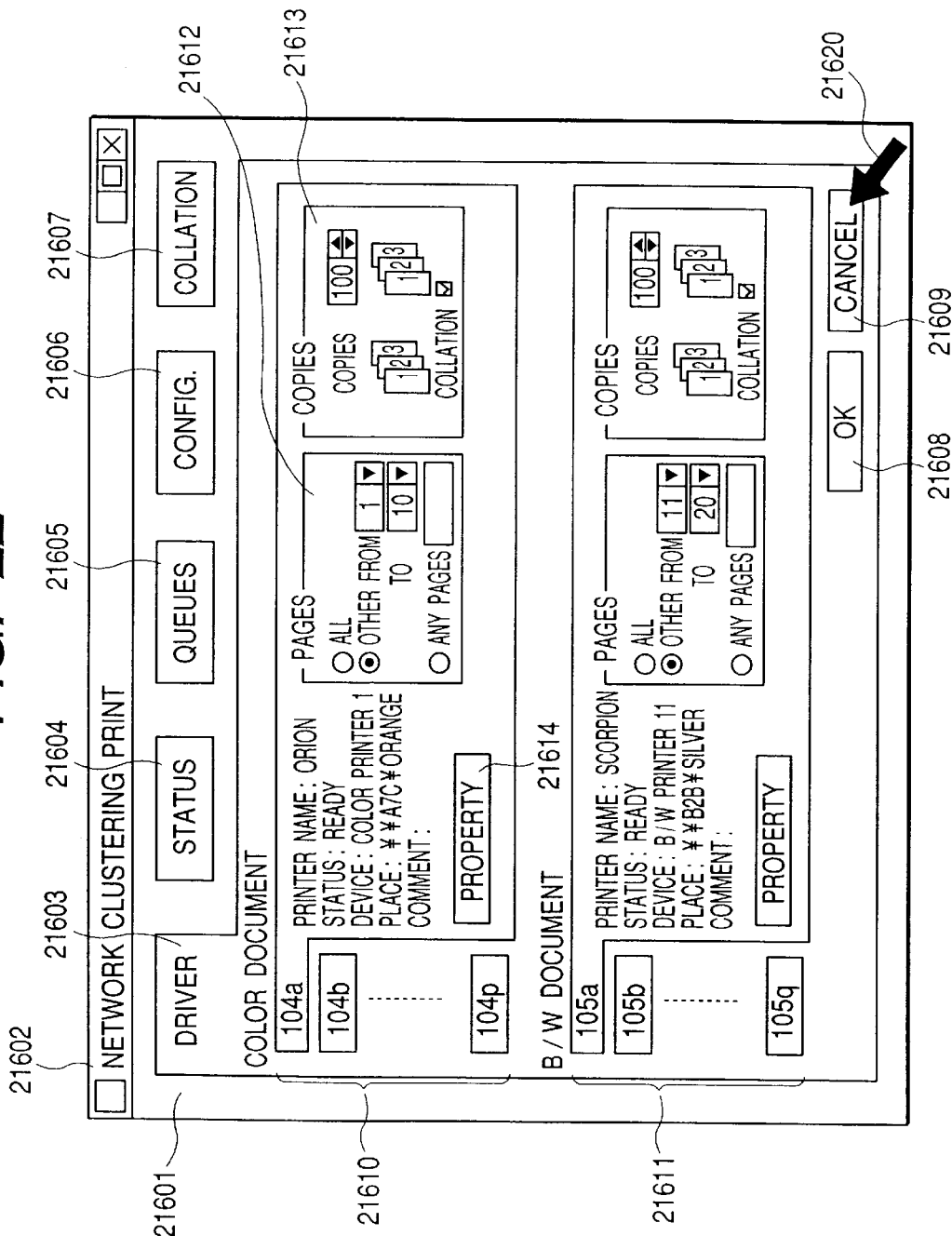
FIG. 22 is a view showing a screen example of a printer driver.

Here, a changing to the following driver screen in FIG. 22 is done by clicking an OK key 21508, and canceling the setting is done by clicking a cancel key 21509.

[Job Utility]

When pressing the OK key 21508 in a job ticket screen, a job utility screen as in FIG. 22 is displayed. Numeral 21603 is a driver tab and the printing from the color MFP 104 and the black/white MFP 105 connected to the network can be started from the screen. Numeral 21604 is a status tab which allows to monitor in detail the situation of each apparatus. Numeral 21605 is a queue tab and allows to know the status of queuing jobs or how busy a device is inside each apparatus.

Then, a config tab 21606 allows to know equipment information. For example, it is possible to know how many bins the sorter which is connected to the MFP has, whether the MFP has a double-side printing function, the quantity of blank papers left and the like. A collation tab 21607 allows to know the job setting instruction to the off-line collator 106 and the status of the job.

[Network Clustering]

A network clustering using the network 101 will be explained. The network clustering is a method for outputting of jobs which separates one (or several) job(s), outputs separately with several color MFP's 104 or several black/white MFP's 105 connected to the same network, and restores each outputted sheaf into the desired page order, or produces the desired number of copies.

[Printer Driver Tab]

Therefore, a separate outputting by the several MFP's must be performed from the server 102 (or client 103). For example, using the printer driver tab as in FIG. 22, by selecting which apparatus to use among the color MFP's 104 or the black/white MFP's 105 hanging from the network 101, each apparatus can be instructed to print a specific part of the job.

Here, numeral 21610 is a tab which allows the setting of pages and the number of copies for each of the color MFP's (104a, 104b, ..., 104p), likewise, numeral 21611 is a tab which allows the setting of pages and the number of copies for each of the black/white MFP's 105 (105a, 105b, ..., 105q). In addition, each tab has certain places 21612 and 21613 to instruct the pages and the number of copies, the operator instructs each number of pages and the number of copies. In the example, the setting example is shown, where the color MFP 104a is set to print one hundred copies of each of the pages one to ten, and the black/white MFP's 105a is set to print one hundred copies of each of the pages eleven to twenty. Then, although not seen in the same figure, the black/white MFP 105b is also set to print one hundred copies of each of the pages twenty-one to twenty-five.

Here, when an OK key 21608 is clicked, the MFP's are instructed to run in reality, the mechanism is such that both the color MFP 104a and the black/white MFP 105a begin the printing simultaneously. In the case the settings must be canceled, clicking a cancel key 21609 is sufficient.

[Status Tab, Queue Tab and Config Tab]

Figure 23:
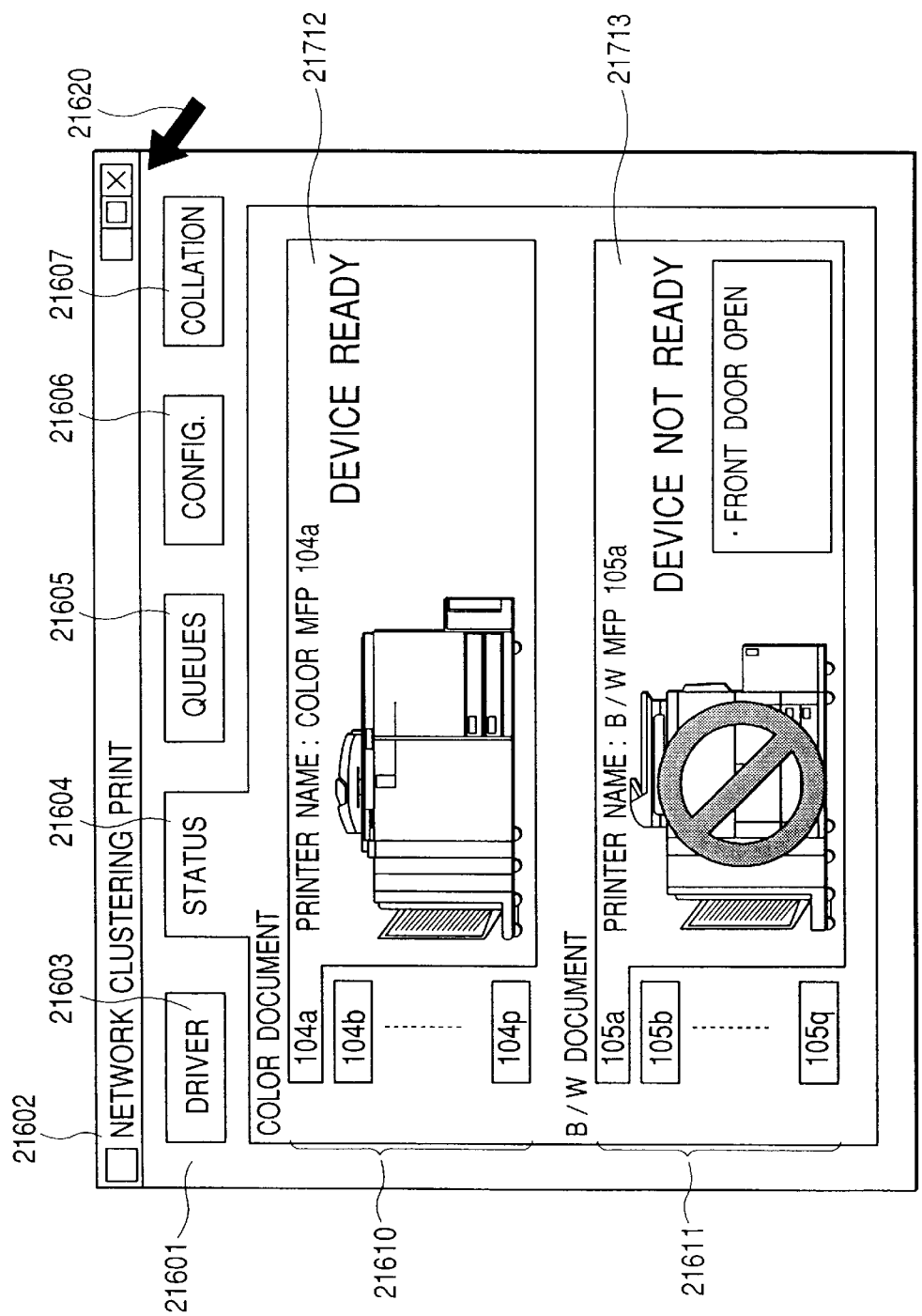
FIG. 23 is a view showing a screen example of a status tab.

Clicking the status tab 21604 changes the screen into a screen as in FIG. 23 and allows to monitor the condition of each device. In FIG. 23, it can be seen at a glance that the MFP 104a is ready to print, but the MFP 105a has an open front door, and can not print immediately.

Figure 24:
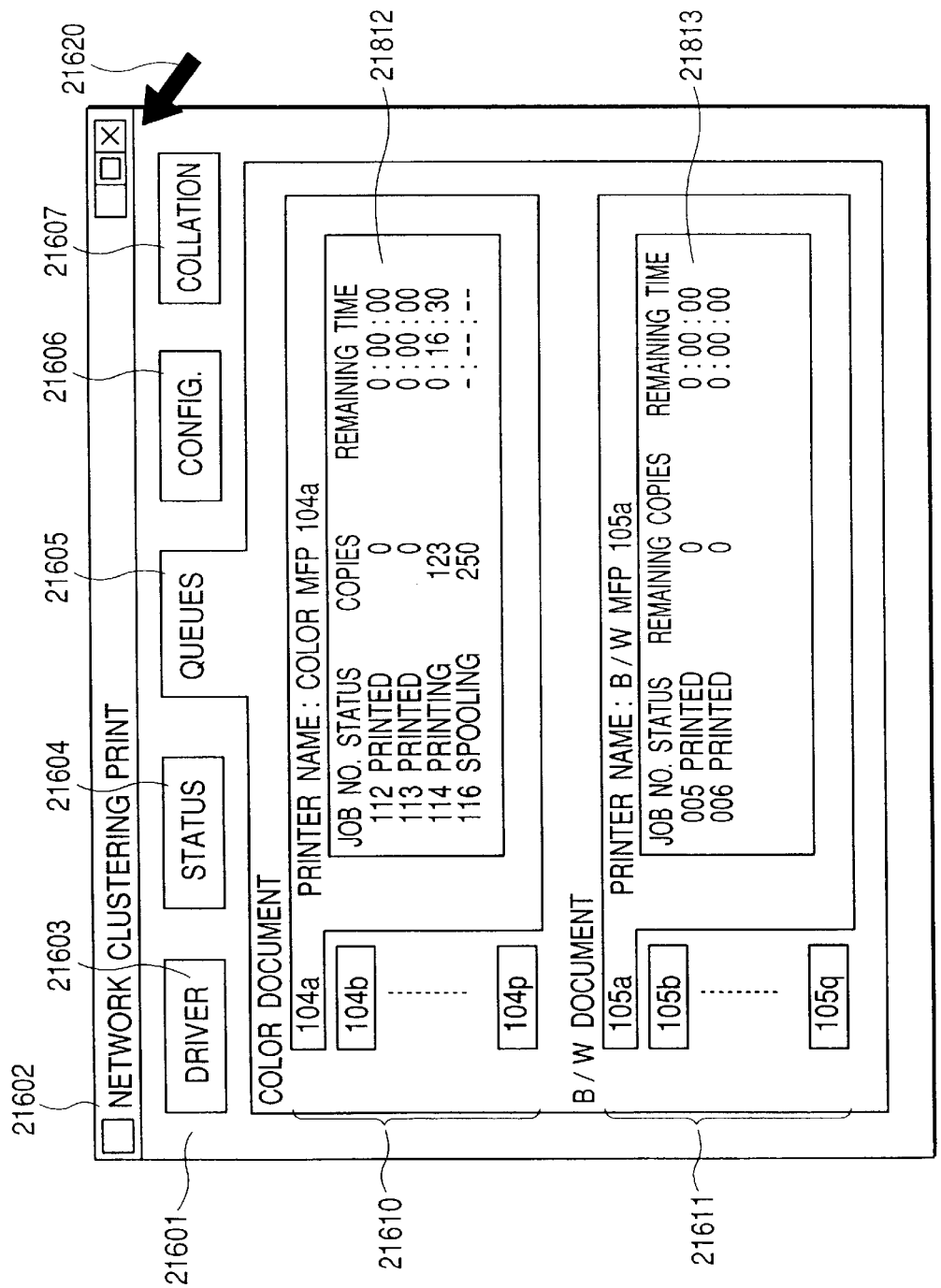
FIG. 24 is a view showing a screen example of a queue tab.

Then, clicking the queue tab 21605 changes the screen into a screen as in FIG. 24 and allows to monitor the job status of each device. In FIG. 24, from the content displayed on a screen 21812, it can be seen that the MFP 104a is in the middle of printing the job 114, that the next job 116 is in the waiting queue and it therefore appears that the printing with another MFP 104 should be faster. On the other hand, appears that the MFP 105 has no job in the waiting queue and the printing can be performed at once.

Figure 25:
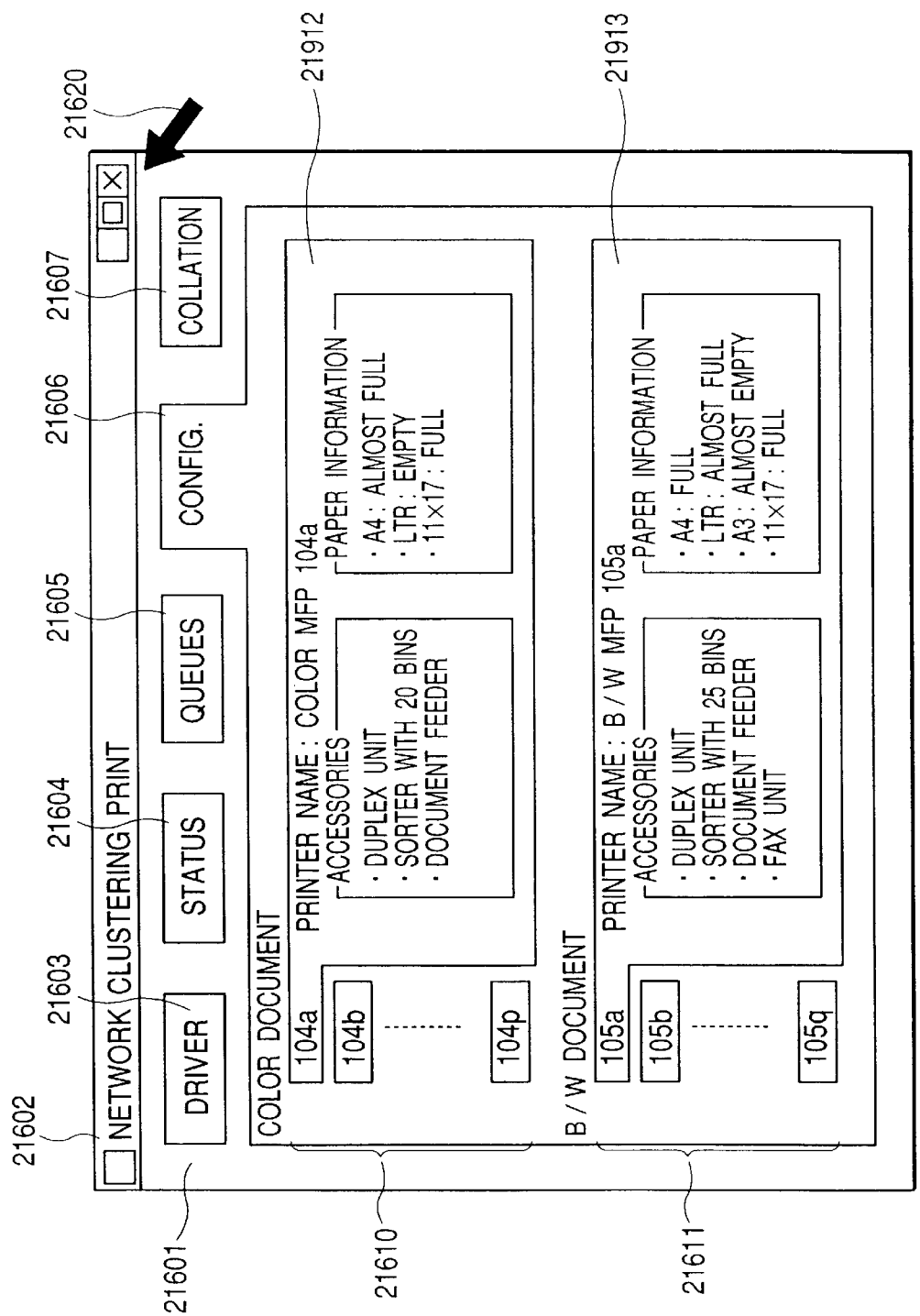
FIG. 25 is a view showing a screen example of a config tab.

Moreover, clicking the config tab 21606 changes the screen into a screen as in FIG. 25 and allows to monitor the types of accessory connected to each device and how much blank pages are left.

[Automatic Mixing of Jobs]

Figure 26:
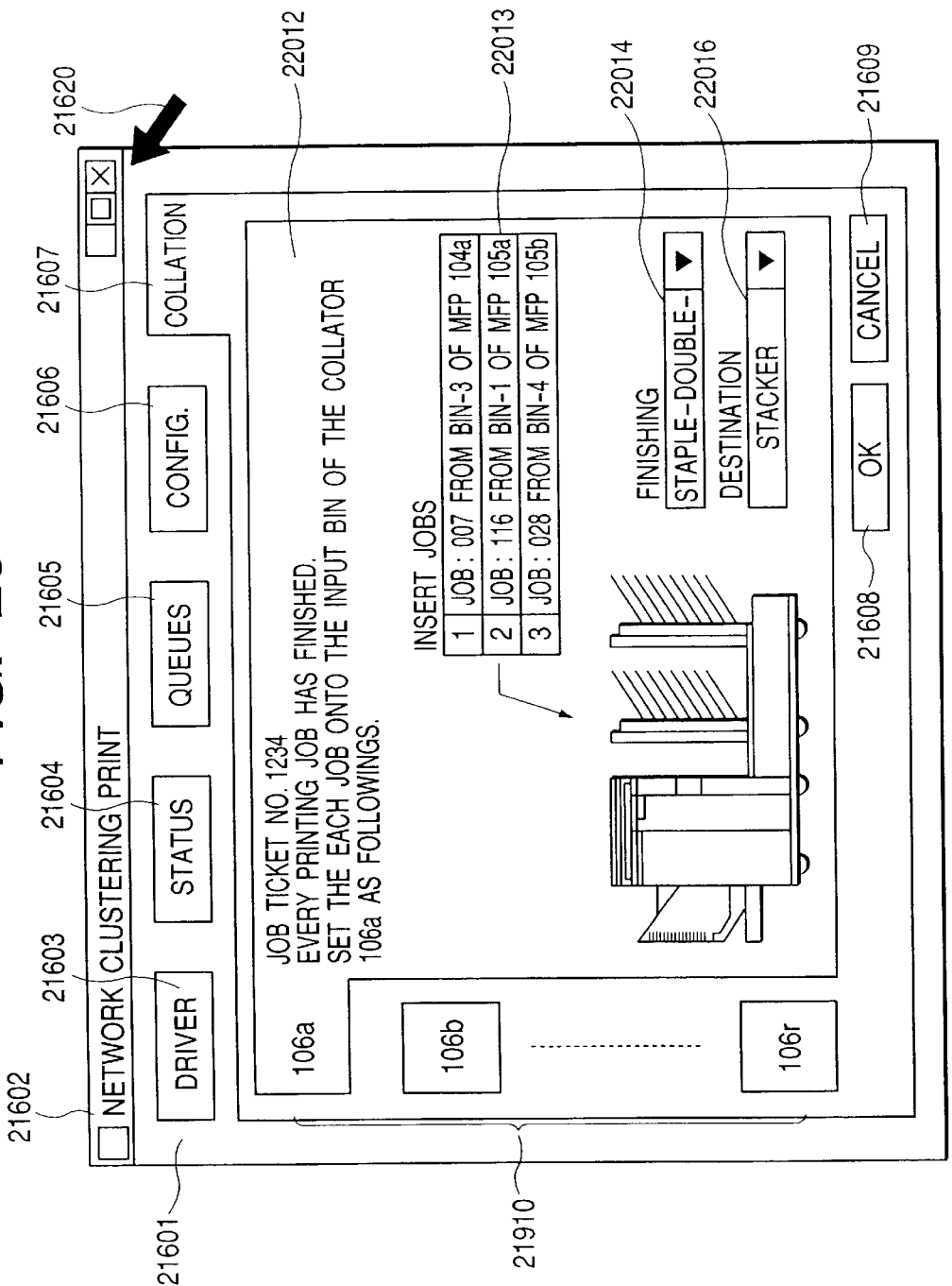
FIG. 26 is a view showing a screen example of a collation tab.

When clicking the OK key 21608 in the driver tab in FIG. 22, the print out is performed in reality by the color MFP 104a and the black/white MFP's 105a and 105b. After deciding that the print out is completed, if the user clicks the collation tab 21607, a screen as in FIG. 26 is seen. The mixing of jobs will be explained using FIG. 26.

First, the user verifies with numeral 22012 in the screen that the outputting of each job is over (that is, all the image formation processing jobs of the job ticket number 1234 are completed), following the instruction of an insert job 22013 on the screen, carries the job sheaves (corresponding to sheaves of recorded papers processed for image formation) from each bin of the sorter of the MFP's and places them as instructed in the input bins of the off-line collator 106a.

The case in FIG. 26, referring to the numeral 22013 on the screen, notifies the user to place the sheaf of recorded sheets collected in the sorter bin 3 of the color MFP 104a into the input bin 1 of the off-line collator 106a, similarly, to place the sheaf of recorded sheets from the sorter bin 1 of the black/white MFP 105a into the input bin 2 of the off-line collator 106a, moreover, to place the sheaf of recorded sheets from the sorter bin 4 of the black/white MFP 105b into the input bin 3 of the off-line collator 106a. Thus, in the present embodiment, an user guidance is provided by displaying which group of sheets collected in which bin of which image formation apparatus should be set in which bin of which collator.

In addition, in case the finishing process should be performed simultaneously, the processing is selected in numeral 22014 of the screen and the destination of the completed job is instructed in numeral 22016 (that is, selection of the discharging tray of the collator which loads the mixed sheets is performed).

After the transfer of all the job sheaves is completed, when the user clicks the OK key 21608, based on the settings on the screen, the off-line collator 106a starts running and the jobs processed separately as each of original pages one to ten, eleven to twenty and twenty-one to twenty-five are assembled into one job and the group of sheets assembled as one job is produced in one hundred copies staple-bound in two places and stored in the stacker.

[Automatic Separation of Jobs and Judgment Between Color and Black/White]

Figure 27:
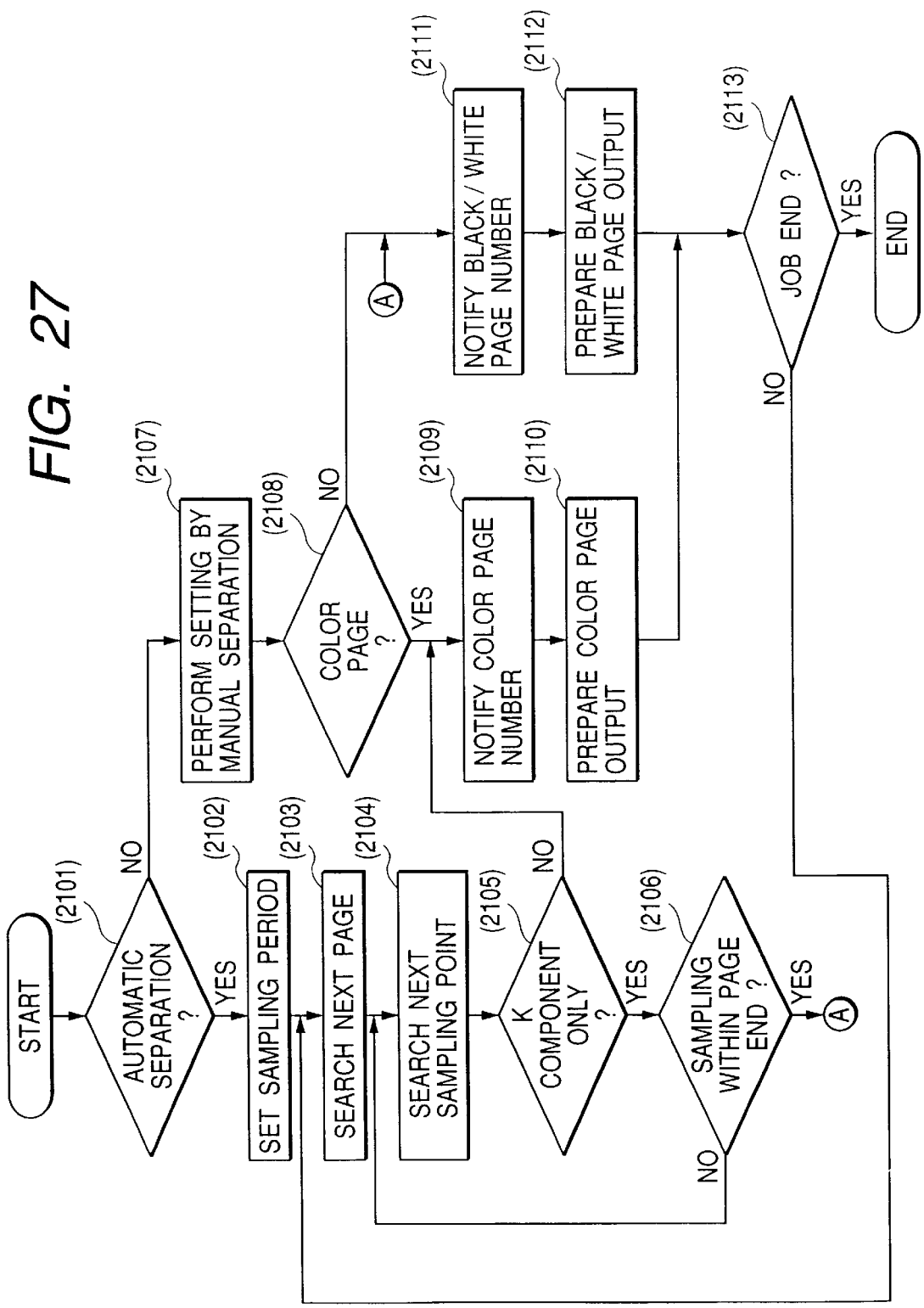
FIG. 27 is a flow chart of a color and black/white pages judgment process.

In the following, an automatic separation between color and black/white jobs will be explained using a flow chart in FIG. 27. When the OK key 21508 of the driver 21501 is pressed, the computer 103 sends through the network 101 the same job data to the color MFP 104 and the black/white MFP 105. However, it is indifferent to send the data in the sending order first the color MFP 104 and then the black/white MFP 105 with a delay in time, or to send simultaneously to both MFP's.

Here, if it judged that the job is set to automatic separation (step 2101), the setting of the sampling cycle is performed (step 2102). However, the setting of sampling is performed beforehand, using a property key 21614 (refer to FIG. 22). For example, if the sampling is performed at a ratio of one point per 100 pixels×100 lines, the sampling time is complete in 1/10000, for a 400 dpi image, considering sampling with a lattice unit of 0.25 inch (=6.35 mm) cycle, even of a letter size (11"×8.5") sheet, if close to 1500 points, judging between color and black/white is possible to some degree. In the case the image is still difficult to judge, the sampling cycle can be set to a finer value, by using the property key 21614, manual operation can be set (step 2107) and judge beforehand which pages are in color and which ones are in black/white (step 2108).

Then, the PDL unit 205 of the color MFP 104 which received the job performs successive raster image processing (RIP), and after RIP, the images are stored for each page unit and for each color component (CMYK) in the semiconductor memory 605. The CPU 603 then judges whether the stored images are in color or black/white. The judgment is performed by assessing the presence or the absence of components other than black (K) (CMY components) for each sample point in the semiconductor memory 605 (step 2105). While so doing, to increase the processing speed, if a color (CMY) component is present in a single sampling point of the page, since the page is a color page, the judgment between color and black/white is interrupted at that point in time and the page is processed as a color page inside the color MFP 104. At this point, the possibility exists, to reprint the job, so the page number information of the color page is used to notify the server 102 through the network 101.

In contrast, if the color (CMY) components do not exist even for a single point in the sampling points in the page, the page is to be processed by the black/white MFP 105 as a black/white page, and the page number information is used to notify the server 102 and the black/white MFP 105, through the network 101.

According to the judgment, as long as the interruption by the job cancel is not inserted, the job is repeated until the last page (step 2113) and the job is completed.

Further, in the above-mentioned explanation, the explanation is given that the rasterizing is performed sequentially for each page, but it is indifferent to temporarily RIP develop an entire job in the high capacity memory (HDD) 604 and sequentially read back and judge each page or several pages in the semiconductor memory 605.

[Multiple Types of OS and Multiple Types of Formats]

In addition, in the system shown in FIG. 20, even if the clients 103 (103*a*, 103*b*, . . . , 103*n*) have different types of OS (Operating System), if the job is sent once to the server 102 and if the sent job group is handled with one job ticket, a page mixing is possible, since it is known from which bin and from which MFP the job is discharged.

Moreover, the page mixing is also possible even if each job has image file format types such as pdf (portable document format), tiff (tagged image file format) or gif (graphic interchange format), and the page mixing is also possible for different types of PDL (Page Description Language) such as PS (Post Script) or PCL or even if the MFP's 104 and 105 have only one of the PDL interpreters.

As explained above, in the image formation system consisting of the image formation apparatus such as the MFP's or the like and the collators having several bins to set the sheets connected to the network, the jobs outputted by the computers connected to the network are separated and processed for image formation by the image formation apparatus. Guidance is provided to the user in determining which of the sheets separated and processed for image formation by the image formation apparatus to set in which bin of which collator. The sheets set in the bin of the collator are mixed by the collator in order to restore the present page order of the job. Therefore, when the job is separated and the sheets processed for image formation are mixed in order to restore the present page order of the job, the loads for the user can be decreased. At the same time, when the user sets the sheets to the collator, a smooth operation is possible.

It is evident that realization can be achieved by supplying to either the system or the apparatus, the storage medium on which the program code of the software which realizes functions in the above-mentioned embodiment (for example, processing shown in flow charts of FIGS. 16 and 24, related processing, job separation processing, job mixing processing, addition information add-on processing for sheets, guidance display processing for user and the like) is recorded, and the computer (or CPU or MPU) of the system or the apparatus reads and executes the program stored inside the storage media.

In this case, it is the program code itself read from the storage media which is to realize the functions of the above-mentioned embodiment and it is the storage media which recorded the program code which is to constitute the current invention.

The storage media used to provide the program code are, for example, floppy disks, hard disks, optical disks, magneto-optical disks, CD-ROMs, CD-Rs, magnetic tapes, non-volatile memory cards, ROM and the likes.

Also, it is evident that included are the cases where the realization of the functions of the above-mentioned embodiment can be achieved not only by executing the program read from the storage media with the computer, but also by the OS (Operating System) or the like operating on the computers, based on the instructions of the program code, performing part of, or all of the actual processing, and that the processing allows the realization of the functions of the above-mentioned embodiment.

Further, it is evident that included are the cases where, after the program code read from the storage media is written to the memory equipping the extension board of the computer or equipping the function extension unit connected to the computer, based on the instructions of the program codes, the CPU equipping the extension board or the function extension unit performs part of, or all of the actual processing, and that the processing allows the realization of the functions of the above-mentioned embodiment.

In addition, it is evident that, although in the embodiment the explanation is given for examples which adopt the electrophotographic system performed by lasers as the printing mechanism part, without restricting to it, any other printing method may be adopted (for example LED printer, thermal transfer printer, inkjet printer or the like).

What is claimed is:
1. An image formation system, which includes at least one of a plurality of apparatuses including a computer, a plurality of image formation apparatuses, and a collator apparatus, the plurality of image formation apparatuses including at least a first image formation apparatus and a second image formation apparatus adapted to print on sheets to be assembled by the collator apparatus, the collator apparatus including a plurality of storage units for storing the sheets and adapted to assemble a plurality of sheaves of sheets respectively held in the plurality of storage units as one sheaf of sheets, said system comprising:

separation means for causing the first image formation apparatus and the second image formation apparatus to execute a separation print process of a job outputted by the computer, in order to divisionally execute printing of the job outputted by the computer by the first image formation apparatus and the second image formation apparatus, such that a first sheaf of sheets of the job printed by the first image formation apparatus and a second sheaf of sheets of the job printed by the second image formation apparatus in the separation print process are assembled as one sheaf of sheets by the collator apparatus;

guide means for providing guidance information, which includes information for enabling a user to discriminate which storage unit of the collator apparatus the first sheaf of sheets of the job printed by the first image formation apparatus should be set to and information for enabling the user to discriminate which storage unit of the collator apparatus the second sheaf of sheets of the job printed by the second image formation apparatus should be set to, in a case in which the first sheaf of sheets of the job printed by the first image formation apparatus and the second sheaf of sheets of the job printed by the second image formation apparatus respectively set in different storage units by the user are to be assembled as one sheaf of sheets by the collator apparatus; and mixing means for causing assembly of the first sheaf of sheets of the job printed by the first image formation apparatus and the second sheaf of sheets of the job printed by the second image formation apparatus, respectively set by the user in the different storage units of the collator apparatus, as one sheaf of sheets in proper page order, in a case in which the first sheaf of sheets of the job printed by the first image formation apparatus and the second sheaf of sheet of the job printed by the second image formation apparatus respectively set in the different storage units of the collator apparatus are to be assembled as one sheaf of sheets by the collator apparatus.

2. A system according to claim 1, wherein said separation means causes each image formation apparatus to execute the separation print process of the job outputted by the computer, based on a page unit.

3. A system according to claim 1, wherein said separation means causes each image formation apparatus to execute the separation print process of the job outputted by the computer, based on a unit of a number of copies.

4. A system according to claim 1, wherein said separation means causes each image formation apparatus to execute the separation print process of the job outputted by the computer, respectively, in color pages and black/white pages.

5. A system according to claim 1, wherein the first image formation apparatus, the second image formation apparatus, and the computer are connectable to a network, and, in a case in which the first image formation apparatus and the second image formation apparatus are to execute the separation print process of the job outputted by the computer, said separation means controls to transfer data of the job outputted by the computer through the network to the first image formation apparatus and the second image formation apparatus.

6. A system according to claim 1, wherein plural collator apparatuses are included in said system, and said guide means provides a guidance that includes information for enabling the user to discriminate which storage unit of which collator apparatus in said system the first sheaf of sheets of the job printed by the first image formation apparatus should be set to and information for enabling the user to discriminate which storage unit of which collator apparatus in said system the second sheaf of sheets of the job printed by the second image formation apparatus should e set to, in a case in which the first sheaf of sheets of the job printed by the first image formation apparatus and the second sheaf of sheets of the job printed by the second image formation apparatus respectively set in storage units of any of the plural collator apparatuses in said system are to be assembled as one sheaf of sheets by the collator apparatus.

7. A system according to claim 1, wherein said guide means provides information for discriminating the job.

8. A system according to claim 1, wherein each image formation apparatus includes plural bins for holding sheets on which images are formed, and said guide means provides a guidance as to which bin of the image formation apparatus is holding sheets to be set in which bin of the collator apparatus, to the user.

9. A system according to claim 1, wherein plural collator apparatuses are included in said system, a plurality of storage units store printed sheets with respect to each image formation apparatus, and said guide means guides the user as to which storage unit of which collator apparatus a sheet held in which storage unit of which image formation apparatus should be set to by the user.

10. A system according to claim 1, further comprising display control means for displaying the guidance information provided by said guide means on a display of the computer.

11. A control method of an image formation system, which includes at least one of a plurality of apparatuses including a computer, a plurality of image formation apparatus and a collator apparatus, the plurality of image formation apparatuses including at least a first image formation apparatus and a second image formation apparatus adapted to print on sheets to be assembled by the collator apparatus, the collator apparatus including a plurality of storage units for storing the sheets and adapted to assemble a plurality of sheaves of sheets respectively held in the plurality of storage units as one sheaf of sheets, said method comprising:

a separation step of causing the first formation apparatus and the second image formation apparatus to execute a separation print process of a job outputted by the computer, in order to divisionally execute printing of the job outputted by the computer by the first image formation apparatus and the second image formation apparatus, such that a first sheaf of sheets of the job printed by the first image formation apparatus and a second sheaf of sheets of the job printed by the second image formation apparatus in the separation print are assembled as one sheaf of sheets by the collator apparatus;

a guide step of providing guidance information, which includes information for enabling a user to discriminate which storage unit of the collator apparatus the first sheaf of sheets of the job printed by the first image formation apparatus should be set to and information for enabling the user to discriminate which storage unit of the collator apparatus the second sheaf of sheets of the job printed by the second image formation apparatus should be set to, in a case in which the first sheaf of sheets of the job printed by the first image formation apparatus and the second sheaf of sheets of the job printed by the second image formation apparatus respectively set in different storage units by the user are to be assembled as one sheaf of sheets by the collator apparatus; and a mixing step of causing assembly of the first sheaf of sheets of the job printed by the first image formation apparatus and the second sheaf of sheets of the job printed by the second image formation apparatus, respectively set by the user in the different storage units of the collator apparatus, as one sheaf of sheets in proper page order, in a case in which the first sheaf of sheets of the job printed by the first image formation apparatus and the second sheaf of sheet of the job printed by the second image formation apparatus respectively set in the different storage units of the collator apparatus are to be assembled as one sheaf of sheets by the collator apparatus.

12. A method according to claim 11, wherein, in said separation step, each image formation apparatus is caused to execute the separation print process of the job outputted by the computer based on a page unit.

13. A method according to claim 11, wherein, in said separation step, each image formation apparatus is caused to execute the separation print process of the job outputted by the computer based on a unit of a number of copies.

14. A method according to claim 11, wherein, in said separation step, each image formation apparatus is caused to execute the separation print process of the job outputted by the computer, respectively, in color pages and black/white pages.

15. A method according to claim 11, wherein the first image formation apparatus, the second image formation apparatus, and the computer are connectable to a network, and, in a case in which the first image formation apparatus and the second image formation apparatus are to execute the separation print process of the job outputted by the computer, said separation step includes controlling to transfer data of the job outputted by the computer through the network to the first image formation apparatus and the second image formation apparatus.

16. A method according to claim 11, wherein plural collator apparatuses are included in the system, and said guide step includes providing a guidance that includes information for enabling the user to discriminate which storage unit of which collator apparatus in the system the first sheaf of sheets of the job printed by the first image formation apparatus should be set to and information for enabling the user to discriminate which storage unit of which collator apparatus in the system the second sheaf of sheets of the job printed by the second image formation apparatus should e set to, in a case in which the first sheaf of sheets of the job printed by the first image formation apparatus and the second sheaf of sheets of the job printed by the second image formation apparatus respectively set in storage units of any of the plural collator apparatuses in the system are to be assembled as one sheaf of sheets by the collator apparatus.

17. A method according to claim 11, wherein information for discriminating the job is provided in said guide step.

18. A method according to claim 11, wherein each image formation apparatus includes plural bins for holding sheets on which images are formed, and said guide step includes providing a guidance as to which bin of the image formation apparatus is holding sheets to be set in which bin of the collator apparatus.

19. A method according to claim 11, wherein plural collator apparatuses are included in the system, a plurality of storage units store printed sheets with respect to each image formation apparatus, and said guide step includes providing a guidance to the user as to which storage unit of which collator apparatus a sheet held in which storage unit of which image formation apparatus should be set to by the user.

20. A method according to claim 11, further comprising a display control step of displaying the guidance information provided in said guide step on a display of the computer.

21. A computer-readable storage medium storing a program for implementing a control method for an image formation system, which includes at least one of a plurality of apparatuses including a computer, a plurality of an image formation apparatus, and a collator apparatus, the plurality of image formation apparatuses including at least a first image formation apparatus and a second image formation apparatus adapted to print on sheets to be assembled by the collator apparatus, the collator apparatus including a plurality of storage units for storing the sheets and adapted to assemble a plurality of sheaves of sheets respectively held in the plurality of storage units as one sheaf of sheets, wherein the method comprises:

a separation step of causing the first image formation apparatus and the second image formation apparatus to execute a separation print process of a job outputted by the computer, in order to divisionally execute printing of the job outputted by the computer by the first image formation apparatus and the second image formation apparatus, such that a first sheaf of sheets of the job printed by the first image formation apparatus and a second sheaf of sheets of the job printed by the second image formation apparatus in the separation print are assembled as one sheaf of sheets by the collator apparatus;

a guide step of providing guidance information, which includes information for enabling a user to discriminate which storage unit of the collator apparatus the first sheaf of sheets of the job printed by the first image formation apparatus should be set to and information for enabling the user to discriminate which storage unit of the collator apparatus the second sheaf of sheets of the job printed by the second image formation apparatus should be set to, in a case in which the first sheaf of sheets of the job printed by the first image formation apparatus and the second sheaf of sheets of the job printed by the second image formation apparatus respectively set in different storage units by the user are to be assembled as one sheaf of sheets by the collator apparatus; and a mixing step of causing assembly of the first sheaf of sheets of the job printed by the first image formation apparatus and the second sheaf of sheets of the job printed by the second image formation apparatus, respectively set by the user in the different storage units of the collator apparatus, as one sheaf of sheets in proper page order, in a case in which the first sheaf of sheets of the job printed by the first image formation apparatus and the second sheaf of sheet of the job printed by the second image formation apparatus respectively set in the different storage units of the collator apparatus are to be assembled as one sheaf of sheets by the collator apparatus.

22. A medium according to claim 21, wherein, in said separation step, each image formation apparatus is caused to execute the separation print process of the job outputted by the computer based on a page unit.

23. A medium according to claim 21, wherein, in said separation step, each image formation apparatus is caused to execute the separation print process of the job outputted by the computer based on a unit of a number of copies.

24. A medium according to claim 21, wherein, in said separation step, each image formation apparatus is caused to execute the separation print process of the job outputted by the computer, respectively, in color pages and black/white pages.

25. A medium according to claim 21, wherein the first image formation apparatus, the second image formation apparatus, and the computer are connectable to a network, and, in a case in which the first image formation apparatus and the second image formation apparatus are to execute the separation print process of the job outputted by the computer, said separation step includes controlling to transfer data of the job outputted by the computer through the network to the first image formation apparatus and the second image formation apparatus.

26. A medium according to claim 21, wherein plural collator apparatuses are included in the system, and said guide step includes providing a guidance that includes information for enabling the user to discriminate which storage unit of which collator apparatus in the system the first sheaf of sheets of the job printed by the first image formation apparatus should be set to and information for enabling the user to discriminate which storage unit of which collator apparatus in the system the second sheaf of sheets of the job printed by the second image formation apparatus should e set to, in a case in which the first sheaf of sheets of the job printed by the first image formation apparatus and the second sheaf of sheets of the job printed by the second image formation apparatus respectively set in storage units of any of the plural collator apparatuses in the system are to be assembled as one sheaf of sheets by the collator apparatus.

27. A medium according to claim 21, wherein information for discriminating the job is provided in said guide step.

28. A medium according to claim 21, wherein each image formation apparatus includes plural bins for holding sheets on which images are formed, and said guide step includes providing a guidance as to which bin of the image formation apparatus is holding sheets to be set in which bin of the collator apparatus.

29. A medium according to claim 21, wherein plural collator apparatuses are included in the system, a plurality of storage units store printed sheets with respect to each image formation apparatus, and said guide step includes providing a guidance to the user as to which storage unit of which collator apparatus a sheet held in which storage unit of which image formation apparatus should be set to by the user.

30. A medium according to claim 21, wherein the method further comprises a display control step of displaying the guidance information provided in said guide step on a display of the computer.

31. An image formation system, which includes at least one of a computer, a plurality of image formation apparatuses, and a collator unit, the plurality of image formation apparatuses including at least a first image formation apparatus and a second image formation apparatus adapted to print on sheets to be assembled by the collator unit, said system comprising:

separation means for causing the first image formation apparatus and the second formation apparatus to execute a separation print process of the job outputted by the computer, in order to divisionally execute printing of the job outputted by the computer by the first image formation apparatus and the second image formation apparatus, such that a first sheaf of sheets of the job printed by the first image formation apparatus and a second sheaf of sheets of the job printed by the second image formation apparatus in the separation print process are assembled as one sheaf of sheets by the collator unit;

information addition means for causing at least one of the plurality of image formation apparatuses to execute printing of additional information, which includes information for enabling the collator unit to set an assemble order of the first sheaf of sheets of the job printed by the first image formation apparatus in the separation print process and the second sheaf of sheets of the job printed by the second image formation apparatus in the separation print process, in a case in which the first sheaf of sheets of the job printed by the first image formation apparatus and the second sheaf of sheets of the job printed by the second image formation apparatus in the separation print process are to be assembled as one sheaf of sheets by the collator unit; and mixing means for causing the collator unit to assemble the first sheaf of sheets of the job printed by the first image formation apparatus in the separation print process and the second sheaf of sheets of the job printed by the second image formation apparatus in the separation print process in an order corresponding to the assemble order based on the additional information set by the collator unit, in a case in which the first sheaf of sheets of the job printed by the first image formation apparatus and the second sheaf of sheets of the job printed by the second image formation apparatus in the separation print process are to be assembled as one sheaf of sheets by the collator unit.

32. A system according to claim 31, wherein said information addition means causes the first image formation apparatus to execute printing of the additional information for sheets corresponding to the first sheaf of sheets of the job printed by the first image formation apparatus in the separation print process, and causes the second image formation apparatus to execute printing of the additional information for sheets corresponding to the second sheaf of sheets of the job printed by the second image formation apparatus in the separation print process, in a case in which the first sheaf of sheets of the job printed by the first image formation apparatus and the second sheaf of sheets of the job printed by the second image formation apparatus in the separation print process are to be assembled as one sheaf of sheets by the collator unit.

33. A system according to claim 31, wherein said information addition means causes the first image formation apparatus to execute printing of the additional information in regard to each page of the first sheaf of sheets of the job printed by the first image formation apparatus in the separation print process, and causes the second image formation apparatus to execute printing of the additional information in regard to each page of the second sheaf of sheets of the job printed by the second image formation apparatus in the separation print process, in a case in which the first sheaf of sheets of the job printed by the first image formation apparatus and the second sheaf of sheets of the job printed by the second image formation apparatus in the separation print process are to be assembled as one sheaf of sheets by the collator unit.

34. A system according to claim 31, wherein said information addition means causes printing of a bar code as the additional information.

35. A system according to claim 31, wherein said separation means causes the first image formation apparatus and the second image formation apparatus to execute the separation print process of the job outputted by the computer according to one of a separation rule for separating the job based on a page unit and a separation rule for separating the job based on a unit of a number of copies.

36. A system according to claim 31, wherein said separation means causes the first image formation apparatus and the second image formation apparatus to execute the separation print process of the job outputted by the computer according to a separation rule for separating the job into color pages and black/white pages.

37. A system according to claim 31, wherein said separation means causes the first image formation apparatus and the second image formation apparatus to execute the separation print process of the job outputted by the computer according to a separation rule for separating the job into photograph pages and character pages.

38. A system according to claim 31, wherein said information addition means differentiates predetermined information to be added to sheets in accordance with an image formation order in an image formation apparatus.

39. A system according to claim 31, wherein said information addition means differentiates predetermined information to be added on sheets in accordance with a judgment regarding whether or not images are sequentially formed on a same page in an image formation apparatus.

40. A control method of an image formation system, which includes at least one of a computer, a plurality of image formation apparatuses, and a collator unit, the plurality of image formation apparatuses including at least a first image formation apparatus and a second image formation apparatus adapted to print on sheets to be assembled by the collator unit, said method comprising:
   a separation step of causing the first image formation apparatus and the second formation apparatus to execute a separation print process of the job outputted by the computer, in order to divisionally execute printing of the job outputted by the computer by the first image formation apparatus and the second image formation apparatus, such that a first sheaf of sheets of the job printed by the first image formation apparatus and a second sheaf of sheets of the job printed by the second image formation apparatus in the separation print process are assembled as one sheaf of sheets by the collator unit;
   information addition step of causing at least one of the plurality of image formation apparatuses to execute printing of additional information, which includes information for enabling the collator unit to set an assemble order of the first sheaf of sheets of the job printed by the first image formation apparatus in the separation print process and the second sheaf of sheets of the job printed by the second image formation apparatus in the separation print process, in a case in which the first sheaf of sheets of the job printed by the first image formation apparatus and the second sheaf of sheets of the job printed by the second image formation apparatus in the separation print process are to be assembled as one sheaf of sheets by the collator unit; and
   a mixing step of causing the collator unit to assemble the first sheaf of sheets of the job printed by the first image formation apparatus in the separation print process and the second sheaf of sheets of the job printed by the second image formation apparatus in the separation print process in an order corresponding to the assemble order based on the additional information set by the collator unit, in a case in which the first sheaf of sheets of the job printed by the first image formation apparatus and the second sheaf of sheets of the job printed by the second image formation apparatus in the separation print process are to be assembled as one sheaf of sheets by the collator unit.

41. A method according to claim 40, wherein, in said information addition step, the first image formation apparatus is caused to execute printing of the additional information for sheets corresponding to the first sheaf of sheets of the job printed by the first image formation apparatus in the separation print process, and the second image formation apparatus is caused to execute printing of the additional information for sheets corresponding to the second sheaf of sheets of the job printed by the second image formation apparatus in the separation print process, in a case in which the first sheaf of sheets of the job printed by the first image formation apparatus and the second sheaf of sheets of the job printed by the second image formation apparatus in the separation print process are to be assembled as one sheaf of sheets by the collator unit.

42. A method according to claim 40, wherein, in said information addition step, the first image formation apparatus is caused to execute printing of the additional information in regard to each page of the first sheaf of sheets of the job printed by the first image formation apparatus in the separation print process, and the second image formation apparatus is caused to execute printing of the additional information in regard to each page of the second sheaf of sheets of the job printed by the second image formation apparatus in the separation print process, in a case in which the first sheaf of sheets of the job printed by the first image formation apparatus and the second sheaf of sheets of the job printed by the second image formation apparatus in the separation print process are to be assembled as one sheaf of sheets by the collator unit.

43. A method according to claim 40, wherein, in said information addition step, a bar code is caused to be printed as the additional information.

44. A method according to claim 40, wherein said separation step includes causing the first image formation apparatus and the second image formation apparatus to execute the separation print process of the job outputted by the computer according to one of a separation rule for separating the job based on a page unit and a separation rule for separating the job based on a unit of a number of copies.

45. A method according to claim 40, wherein said separation step includes causing the first image formation apparatus and the second image formation apparatus to execute the separation print process of the job outputted by the computer according to a separation rule for separating the job into color pages and black/white pages.

46. A method according to claim 40, wherein said separation step includes causing the first image formation apparatus and the second image formation apparatus to execute the separation print process of the job outputted by the computer according to a separation rule for separating the job into photograph pages and character pages.

47. A method according to claim 40, wherein predetermined information to be added to sheets is differentiated in accordance with an image formation order in an image formation apparatus, in said information addition step.

48. A method according to claim 40, wherein predetermined information to be added to sheets is differentiated in accordance with a judgment regarding whether or not images are sequentially formed on a same page in an image formation apparatus, in said information addition step.

49. A computer-readable storage medium storing a program for implementing a control method for an image formation system, which includes at least one of a computer, a plurality of image formation apparatuses, and a collator unit, the plurality of image formation apparatuses including at least a first image formation apparatus and a second image formation apparatus adapted to print on sheets to be assembled by the collator unit, wherein the method comprises:

a separation step of causing the first image formation apparatus and the second formation apparatus to execute a separation print process of the job outputted by the computer, in order to divisionally execute printing of the job outputted by the computer by the first image formation apparatus and the second image formation apparatus, such that a first sheaf of sheets of the job printed by the first image formation apparatus and a second sheaf of sheets of the job printed by the second image formation apparatus in the separation print process are assembled as one sheaf of sheets by the collator unit;

an information addition step of causing at least one of the plurality of image formation apparatuses to execute printing of additional information, which includes information for enabling the collator unit to set an assemble order of the first sheaf of sheets of the job printed by the first image formation apparatus in the separation print process and the second sheaf of sheets of the job printed by the second image formation apparatus in the separation print process, in a case in which the first sheaf of sheets of the job printed by the first image formation apparatus and the second sheaf of sheets of the job printed by the second image formation apparatus in the separation print process are to be assembled as one sheaf of sheets by the collator unit; and a mixing step of causing the collator unit to assemble the first sheaf of sheets of the job printed by the first image formation apparatus in the separation print process and the second sheaf of sheets of the job printed by the second image formation apparatus in the separation print process in an order corresponding to the assemble order based on the additional information set by the collator unit, in a case in which the first sheaf of sheets of the job printed by the first image formation apparatus and the second sheaf of sheets of the job printed by the second image formation apparatus in the separation print process are to be assembled as one sheaf of sheets by the collator unit.

50. A medium according to claim 49, wherein, in said information addition step, the first image formation apparatus is caused to execute printing of the additional information for sheets corresponding to the first sheaf of sheets of the job printed by the first image formation apparatus in the separation print process, and the second image formation apparatus is caused to execute printing of the additional information for sheets corresponding to the second sheaf of sheets of the job printed by the second image formation apparatus in the separation print process, in a case in which the first sheaf of sheets of the job printed by the first image formation apparatus and the second sheaf of sheets of the job printed by the second image formation apparatus in the separation print process are to be assembled as one sheaf of sheets by the collator unit.

51. A medium according to claim 49, wherein, in said information addition step, the first image formation apparatus is caused to execute printing of the additional information in regard to each page of the first sheaf of sheets of the job printed by the first image formation apparatus in the separation print process, and the second image formation apparatus is caused to execute printing of the additional information in regard to each page of the second sheaf of sheets of the job printed by the second image formation apparatus in the separation print process, in a case in which the first sheaf of sheets of the job printed by the first image formation apparatus and the second sheaf of sheets of the job printed by the second image formation apparatus in the separation print process are to be assembled as one sheaf of sheets by the collator unit.

52. A medium according to claim 49, wherein, in said information addition step, a bar code is caused to be printed as the additional information.

53. A medium according to claim 49, wherein said separation step includes causing the first image formation apparatus and the second image formation apparatus to execute the separation print process of the job outputted by the computer according to one of a separation rule for separating the job based on a page unit and a separation rule for separating the job based on a unit of a number of copies.

54. A medium according to claim 49, wherein said separation step includes causing the first image formation apparatus and the second image formation apparatus to execute the separation print process of the job outputted by the computer according to a separation rule for separating the job into color pages and black/white pages.

55. A medium according to claim 49, wherein said separation step includes causing the first image formation apparatus and the second image formation apparatus to execute the separation print process of the job outputted by the computer according to a separation rule for separating the job into photograph pages and character pages.

56. A medium according to claim 49, wherein predetermined information to be added to sheets is differentiated in accordance with an image formation order in an image formation apparatus, in said information addition step.

57. A medium according to claim 49, wherein predetermined information to be added to sheets is differentiated in accordance with a judgment regarding whether or not images are sequentially formed on a same page in an image formation apparatus, in said information addition step.

58. An image formation system, which includes at least one of a plurality of apparatuses including a computer, a plurality of image formation apparatuses, and a collator unit, the plurality of image formation apparatuses including at least a first image formation apparatus and a second image formation apparatus adapted to print on sheets to be assembled by the collator unit, said system comprising:

control means for causing at least either one of the first image formation apparatus and the second image formation apparatus to print a first job and a second job mutually independent of each other;

information addition means for causing at least one of the plurality of apparatuses to generate additional information, which includes information for enabling the collator unit to set an assemble order of a first sheaf of sheets on which data of the first job has been printed and a second sheaf of sheets on which data of the second job has been printed, in a case in which setting of the collator unit to assemble the first sheaf of sheets on which the data of the first job has been printed and the second sheaf of sheets on which the data of the second job has been printed as one sheaf of sheets is performed through any of the plurality of apparatuses; and mixing means for causing the collator unit to assemble the first sheaf of sheets on which the data of the first job has been printed and the second sheaf of sheets on which the data of the second job has been printed in an order corresponding to the assemble order set by the collator unit based on the additional information, in a case in which the setting of the collator unit to assemble the first sheaf of sheets on which the data of the first job has been printed and the second sheaf of sheets on which the data of the second job has been printed as one sheaf of sheets is performed through any of the plurality of apparatuses.

59. A system according to claim 58, wherein said information addition means causes at least either of the first image formation apparatus and the second image formation apparatus to execute printing of the additional information in regard to sheets corresponding to the first sheaf of sheets on which the data of the first job has been printed and causes at least either of the first image formation apparatus and the second image formation apparatus to execute printing of the additional information in regard to sheets corresponding to the second sheaf of sheets on which the data of the second job has been printed, in a case in which the setting of the collator unit to assemble the first sheaf of sheets on which the data of the first job has been printed and the second sheaf of sheets on which the data of the second job has been printed as one sheaf of sheets is performed through any of the plurality of apparatuses.

60. A system according to claim 58, wherein said information addition means causes at least either of the first image formation apparatus and the second image formation apparatus to execute printing of the additional information in regard to each page of the first sheaf of sheets on which the data of the first job has been printed and causes at least either of the first image formation apparatus and the second information apparatus to execute printing of the additional information in regard to each page of the second sheaf of sheets on which the data of the second job has been printed, in a case in which the setting of the collator unit to assemble the first sheaf of sheets on which the data of the first job has been printed and the second sheaf of sheets on which the data of the second job has been printed as one sheaf of sheets is performed through any of the plurality of apparatuses.

61. A system according to claim 58, wherein said information addition means causes printing of a bar code as the additional information.

62. A system according to claim 58, wherein the first job and the second job have respectively different file formats.

63. A system according to claim 58, wherein the first job and the second job are jobs that are independently generated respectively by a plurality of computers operating on respectively different kinds of operating systems.

64. A control method of an image formation system, which includes at least one of a plurality of apparatuses including a computer, a plurality of image formation apparatuses, and a collator unit, the plurality of image formation apparatuses including at least a first image formation apparatus and a second image formation apparatus adapted to print on sheets to be assembled by the collator unit, said method comprising:

control step of causing at least either one of the first image formation apparatus and the second image formation apparatus to print a first job and a second job mutually independent of each other;

information addition step of causing at least one of the plurality of apparatuses to generate additional information, which includes information for enabling the collator unit to set an assemble order of a first sheaf of sheets on which data of the first job has been printed and a second sheaf of sheets on which data of the second job has been printed, in a case in which setting of the collator unit to assemble the first sheaf of sheets on which the data of the first job has been printed and the second sheaf of sheets on which the data of the second job has been printed as one sheaf of sheets is performed through any of the plurality of apparatuses; and mixing step of causing the collator unit to assemble the first sheaf of sheets on which the data of the first job has been printed and the second sheaf of sheets on which the data of the second job has been printed in an order corresponding to the assemble order set by the collator unit based on the additional information, in a case in which the setting of the collator unit to assemble the first sheaf of sheets on which the data of the first job has been printed and the second sheaf of sheets on which the data of the second job has been printed as one sheaf of sheets is performed through any of the plurality of apparatuses.

65. A method according to claim 64, wherein, in said information addition step, at least either of the first image formation apparatus and the second image formation apparatus is caused to execute printing of the additional information in regard to sheets corresponding to the first sheaf of sheets on which the data of the first job has been printed and at least either of the first image formation apparatus and the second image formation apparatus is caused to execute printing of the additional information in regard to sheets corresponding to the second sheaf of sheets on which the data of the second job has been printed, in a case in which the setting of the collator unit to assemble the first sheaf of sheets on which the data of the first job has been printed and the second sheaf of sheets on which the data of the second job has been printed as one sheaf of sheets is performed through any of the plurality of apparatuses.

66. A method according to claim 64, wherein, in said information addition step, at least either of the first image formation apparatus and the second image formation apparatus is caused to execute printing of the additional information in regard to each page of the first sheaf of sheets on which the data of the first job has been printed and at least either of the first image formation apparatus and the second information apparatus is caused to execute printing of the additional information in regard to each page of the second sheaf of sheets on which the data of the second job has been printed, in a case in which the setting of the collator unit to assemble the first sheaf of sheets on which the data of the first job has been printed and the second sheaf of sheets on which the data of the second job has been printed as one sheaf of sheets is performed through any of the plurality of apparatuses.

67. A method according to claim 64, wherein a bar code is printed as the additional information in said information addition step.

68. A method according to claim 64, wherein the first job and the second job have respectively different file formats.

69. A method according to claim 64, wherein the first job and the second job are jobs that are independently generated respectively by a plurality of computers operating on respectively different kinds of operating systems.

70. A computer-readable storage medium storing a program for implementing a control method for an image formation system, which includes at least one of a plurality of apparatuses including a computer, a plurality of image formation apparatuses, and a collator unit, the plurality of image formation apparatuses including at least a first image formation apparatus and a second image formation apparatus adapted to print on sheets to be assembled by the collator unit, wherein the method comprises:

- a control step of causing at least one of the first image formation apparatus and the second image formation apparatus to print a first job and a second job mutually independent of each other;
- an information addition step of causing at least one of the plurality of apparatuses to generate additional information, which includes information for enabling the collator unit to set an assemble order of a first sheaf of sheets on which data of the first job has been printed and a second sheaf of sheets on which data of the second job has been printed, in a case in which setting of the collator unit to assemble the first sheaf of sheets on which the data of the first job has been printed and the second sheaf of sheets on which the data of the second job has been printed as one sheaf of sheets is performed through any of the plurality of apparatuses; and
- mixing step of causing the collator unit to assemble the first sheaf of sheets on which the data of the first job has been printed and the second sheaf of sheets on which the data of the second job has been printed in an order corresponding to the assemble order set by the collator unit based on the additional information, in a case in which the setting of the collator unit to assemble the first sheaf of sheets on which the data of the first job has been printed and the second sheaf of sheets on which the data of the second job has been printed as one sheaf of sheets is performed through any of the plurality of apparatuses.

71. A medium according to claim 70, wherein, in said information addition step, at least either of the first image formation apparatus and the second image formation apparatus is caused to execute printing of the additional information in regard to sheets corresponding to the first sheaf of sheets on which the data of the first job has been printed and at least either of the first image formation apparatus and the second image formation apparatus is caused to execute printing of the additional information in regard to sheets corresponding to the second sheaf of sheets on which the data of the second job has been printed, in a case in which the setting of the collator unit to assemble the first sheaf of sheets on which the data of the first job has been printed and the second sheaf of sheets on which the data of the second job has been printed as one sheaf of sheets is performed through any of the plurality of apparatuses.

72. A medium according to claim 70, wherein, in said information addition step, at least either of the first image formation apparatus and the second image formation apparatus is caused to execute printing of the additional information in regard to each page of the first sheaf of sheets on which the data of the first job has been printed and at least either of the first image formation apparatus and the second information apparatus is caused to execute printing of the additional information in regard to each page of the second sheaf of sheets on which the data of the second job has been printed, in a case in which the setting of the collator unit to assemble the first sheaf of sheets on which the data of the first job has been printed and the second sheaf of sheets on which the data of the second job has been printed as one sheaf of sheets is performed through any of the plurality of apparatuses.

73. A medium according to claim 70, wherein a bar is printed as the additional information in said information addition step.

74. A medium according to claim 70, wherein the first job and the second job have respectively different file formats.

75. A medium according to claim 70, wherein the first job and the second job are jobs that are independently generated respectively by a plurality of computers operating on respectively different kinds of operating systems.

* * * * *

UNITED STATES PATENT AND TRADEMARK OFFICE
CERTIFICATE OF CORRECTION

PATENT NO. : 6,727,999 B1
DATED : April 27, 2004
INVENTOR(S) : Hiroyuki Takahashi It is certified that error appears in the above-identified patent and that said Letters Patent is hereby corrected as shown below:

Title page,
Item [57], ABSTRACT,
Line 1, "for an" should read -- for a --.

Drawings,
Sheet 26, Fig. 26, "SET THE" should read -- SET --; and "FOLLOWINGS." should read -- FOLLOWS --.

Column 1,
Lines 13 and 64, "an" should read -- a --.
Line 43, "assort" should read -- sort --.

Column 2,
Line 11, "of an" should be deleted.
Line 28, "ratus respectively;" should read -- ratus; --.

Column 3,
Line 6, "sever," should read -- server, --
Line 19, "sort" should read -- sorts --.
Line 33, "an" should read -- a --.

Figure 7:
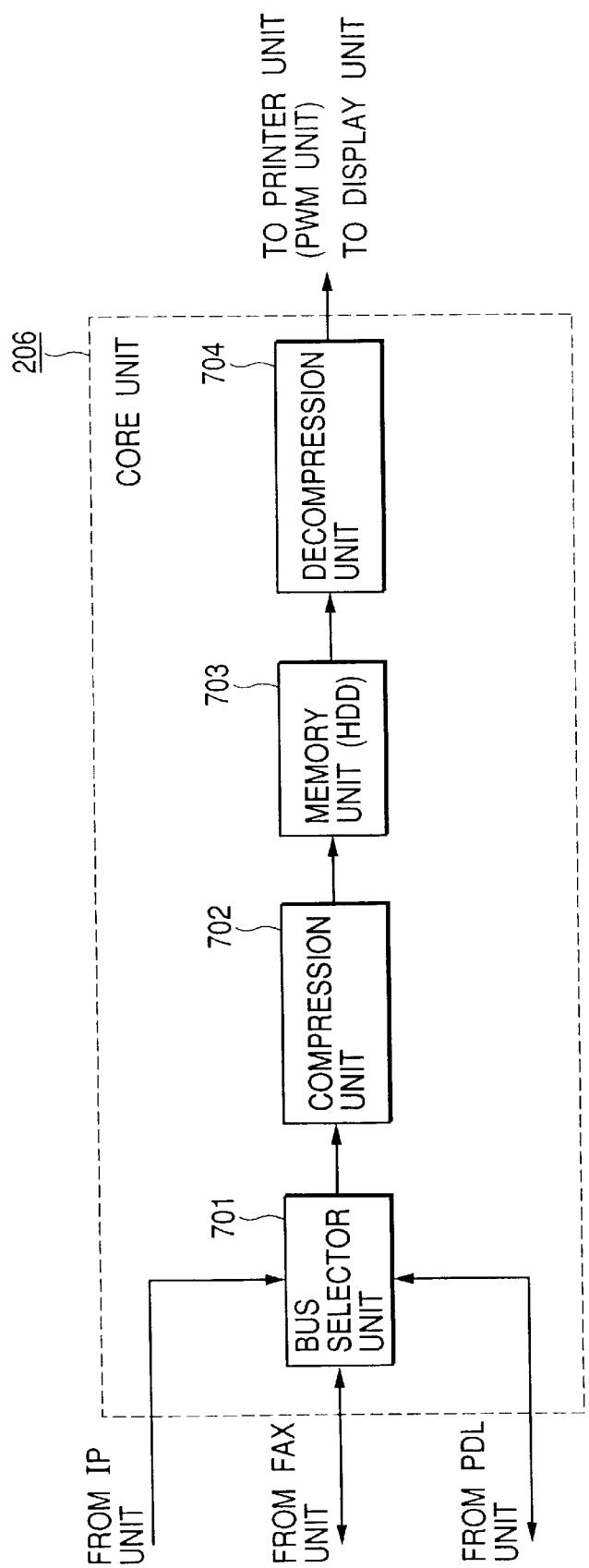
FIG. 7 is a block diagram of a core unit of the image formation apparatus.
Figure 8:
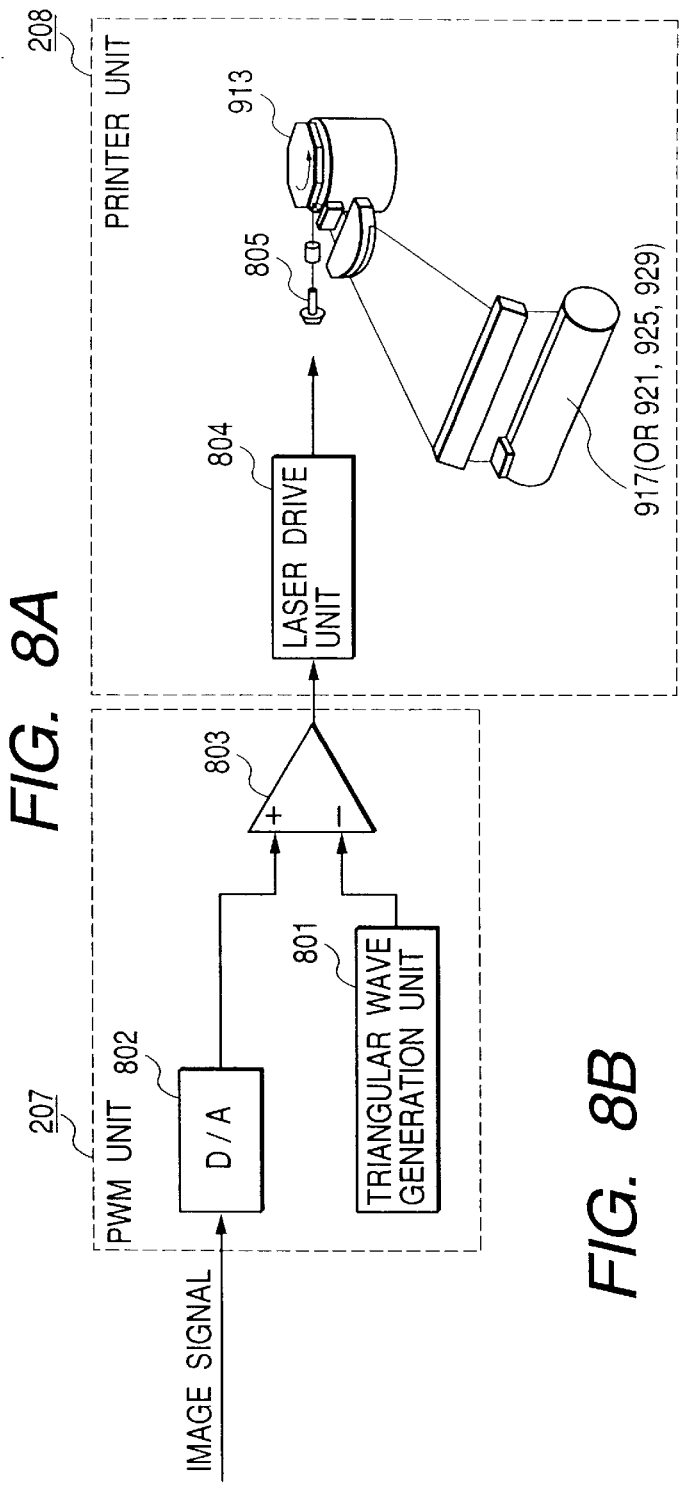
FIGS. 8A and 8B are respectively a block diagram and a timing chart of a PWM unit of the image formation apparatus respectively.

Column 5,
Line 55, "FIG. 7" should read -- FIG. 7. --.

Column 8,
Line 46, "coexist" should read -- coexists --.

Column 9,
Line 22, "is" should read -- are --.
Line 50, "an" should read -- a --.

Column 11,
Line 37, "restriction" should read -- restriction of --.
Line 41, "sort" should read -- sorts --.
Line 49, "an" should be deleted.
Line 53, "switched" should read -- switches --.

UNITED STATES PATENT AND TRADEMARK OFFICE
CERTIFICATE OF CORRECTION

PATENT NO.    : 6,727,999 B1
DATED         : April 27, 2004
INVENTOR(S)   : Hiroyuki Takahashi It is certified that error appears in the above-identified patent and that said Letters Patent is hereby corrected as shown below:

Column 13,
Line 60, "sort" should read -- sorts --.

Column 14,
Line 8, "an" should read -- a --.
Line 29, "likes" should read -- like --.
Line 42, "restriction" should read -- restriction of --.
Line 46, "sort" should read -- sorts --.

Column 16,
Line 39, "an" should read -- a --.

Column 18,
Line 31, "likes." should read -- like. --

Column 19,
Line 36, "sheet" should read -- sheets --.

Column 20,
Line 6, "e" should read -- be --.

Column 21,
Line 11, "sheet" should read -- sheets --.
Line 49, "e" should read -- be --.

Column 22,
Line 55, "sheet" should read -- sheets --.

Column 23,
Line 26, "e" should read -- be --.

UNITED STATES PATENT AND TRADEMARK OFFICE
CERTIFICATE OF CORRECTION

PATENT NO.   : 6,727,999 B1
DATED        : April 27, 2004
INVENTOR(S)  : Hiroyuki Takahashi It is certified that error appears in the above-identified patent and that said Letters Patent is hereby corrected as shown below:

Column 32,
Line 28, "bar" should read -- bar code --.

Signed and Sealed this

Fifth Day of October, 2004

JON W. DUDAS
*Director of the United States Patent and Trademark Office*